(12) United States Patent
Jiang et al.

(10) Patent No.: US 11,343,838 B2
(45) Date of Patent: May 24, 2022

(54) METHOD AND DEVICE IN UE AND BASE STATION FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 130 days.

(21) Appl. No.: 16/831,822

(22) Filed: Mar. 27, 2020

(65) Prior Publication Data

US 2020/0229222 A1 Jul. 16, 2020

Related U.S. Application Data

(63) Continuation of application No. PCT/CN2019/095951, filed on Jul. 15, 2019.

(30) Foreign Application Priority Data

Jul. 24, 2018 (CN) .......................... 201810815340.8

(51) Int. Cl.
*H04W 72/12* (2009.01)
*H04W 16/14* (2009.01)
*H04W 72/04* (2009.01)
*H04W 74/08* (2009.01)

(52) U.S. Cl.
CPC ....... *H04W 72/1273* (2013.01); *H04W 16/14* (2013.01); *H04W 72/0413* (2013.01);
(Continued)

(58) Field of Classification Search
CPC ............. H04W 72/0446; H04W 16/14; H04W 72/1273; H04W 74/0833; H04W 72/0413;
(Continued)

(56) References Cited

U.S. PATENT DOCUMENTS

| 2016/0278074 A1 | 9/2016 | Yang |
| 2018/0152954 A1 | 5/2018 | Golitschek Edler Von Elbwart et al. |

(Continued)

FOREIGN PATENT DOCUMENTS

| CN | 105611637 A | 5/2016 |
| CN | 105848165 A | 8/2016 |

(Continued)

OTHER PUBLICATIONS

ISR received in application No. PCT/CN2019/095951 dated Sep. 27, 2019.

(Continued)

*Primary Examiner* — Brian D Nguyen

(57) ABSTRACT

The disclosure provides a method and a device in a User Equipment (UE) and a base station for wireless communication. The UE first receives K downlink signalings, the K downlink signalings indicating K time-frequency resources respectively; then the UE determines K1 time-frequency resource(s) from the K time-frequency resources, only the K1 time-frequency resource(s) among the K time-frequency resources needing no listening before wireless transmission therein; and finally the UE transmits target information in a target time-frequency resource; wherein the target time-frequency resource is one of the K1 time-frequency resource(s) determined according to a predefined criterion, and the K time-frequency resources are all deployed on unlicensed spectrum. The disclosure transmits the target information in the target time-frequency resource by designing a predefined criterion, improving the reliability of trans- (Continued)

mission of uplink channel in unlicensed spectrum scenarios, particularly the reliability of transmission of uplink control information.

16 Claims, 17 Drawing Sheets

(52) U.S. Cl.
CPC ... *H04W 72/0446* (2013.01); *H04W 72/0453* (2013.01); *H04W 74/0833* (2013.01)

(58) Field of Classification Search
CPC ............... H04W 74/04; H04W 74/006; H04W 72/0453; H04L 5/00
See application file for complete search history.

(56) References Cited

U.S. PATENT DOCUMENTS

| | | | |
|---|---|---|---|
| 2018/0227838 A1* | 8/2018 | Hayashi | H04W 72/042 |
| 2018/0352575 A1* | 12/2018 | You | H04W 16/14 |
| 2019/0021112 A1* | 1/2019 | Harada | H04W 74/004 |
| 2019/0037584 A1* | 1/2019 | Park | H04W 72/1268 |
| 2021/0037564 A1* | 2/2021 | Futaki | H04W 72/0413 |
| 2021/0227594 A1* | 7/2021 | Lee | H04W 24/08 |
| 2021/0243634 A1* | 8/2021 | Li | H04L 1/0026 |
| 2021/0266963 A1* | 8/2021 | Noh | H04W 74/006 |

FOREIGN PATENT DOCUMENTS

| | | |
|---|---|---|
| CN | 107466110 A | 12/2017 |
| CN | 107949067 A | 4/2018 |

OTHER PUBLICATIONS

Sony DRS Design for NR Unlicensed Spectrum 3GPP TSG RAN WG1 Meeting AH_NR #3, R1-1716253, Sep. 11, 2017.
First Office Action received in application No. CN201810815340.8 dated Jul. 26, 2021.
First Search Report received in application No. CN201810815340.8 dated Jul. 20, 2021.

* cited by examiner

METHOD AND DEVICE IN UE AND BASE STATION FOR WIRELESS COMMUNICATION

CROSS-REFERENCE TO RELATED APPLICATION

This application is a continuation of International Application No. PCT/CN2019/095951, filed on Jul. 15, 2019, claiming the priority benefit of Chinese Application No. 201810815340.8, filed on Jul. 24, 2018, the full disclosure of which is incorporated herein by reference.

BACKGROUND

Technical Field

The disclosure relates to transmission methods and devices in wireless communication systems, and in particular to a communication method and device supporting Listen Before Talk (LBT).

Related Art

Application scenarios of future wireless communication systems are becoming increasingly diversified, and different application scenarios have different performance requirements for systems. In order to meet different performance requirements of various application scenarios, the $3^{rd}$ Generation Partner Project (3GPP) Radio Access Network (RAN) #72 plenary session had approved a study item of access to unlicensed spectrum under New Radio (NR).

In Long Term Evolution (LTE) License Assisted Access (LAA), a transmitter (base station or UE) needs to perform LBT before transmitting data on unlicensed spectrum so as to avoid causing interferences to other wireless transmissions that are ongoing on unlicensed spectrum. In the Cat 4 LBT (Category 4 LBT, refer to 3GPP TR36.889) process, the transmitter will conduct backoff after a certain defer duration, the time of backoff is counted in unit of a Clear Channel Assessment (CCA) slot duration, and the number of slot durations of backoff is obtained by the transmitter's random selection in a Contention Window Size (CWS). For downlink transmission, the CWS is adjusted according to a Hybrid Automatic Repeat reQuest (HARD) feedback corresponding to data in one previous reference subframe transmitted on the unlicensed spectrum. For uplink transmission, the CWS is adjusted according to whether data in one previous reference subframe on the unlicensed spectrum includes new data.

At the 3GPP Radio Access Network Group 1 (3GPP RAN1) #93 plenary session, common knowledges as follows were reached in view of NR LAA. In one gNB (next-generation base station) Channel Occupation Time (COT), no-LBT may be applied to LAA communications for downlink-to-uplink or uplink-to-downlink time intervals of less than 16 us (micro second).

SUMMARY

According to the above common knowledges of NR LAA, a radio signal transmitted by a target transmitter occupies air interface resources, and a target receiver can directly switch into a transmitting state without performing LBT. The inventor finds through researches that it is a feasible scheme that a base station indicates whether to perform LBT through a downlink signaling. The inventor finds through further researches that, if one UE detects multiple downlink signalings, some of which indicate LBT while some indicate no-LBT, and the UE needs to perform transmission of Uplink Control Information (UCI) at this time, then how does the UE perform uplink transmission is a problem to be solved.

In view of the above problems, the disclosure provides a solution. It should be noted that embodiments of the disclosure and characteristics of the embodiments may be mutually combined arbitrarily. Further, although the disclosure is initially designed in view of LAA communications, the method and device in the disclosure are also applicable to communications on licensed spectrum, for example, Device to Device (D2D), etc.

The disclosure provides a method in a UE for wireless communication, wherein the method includes:

receiving K downlink signalings, the K downlink signalings indicating K time-frequency resources respectively;

determining K1 time-frequency resource(s) from the K time-frequency resources, only the K1 time-frequency resource(s) among the K time-frequency resources needing no listening before wireless transmission therein; and transmitting target information in a target time-frequency resource.

Herein, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the above method has the following benefits: when the UE has multiple uplink resources needing no listening, that is, corresponding to the K1 time-frequency resources in the above method, the UE determines the target time-frequency resource from the K1 time-frequency resources according to a predefined criterion, thereby ensuring that the target information transmitted in the target time-frequency resource can be correctly received by a base station.

In one embodiment, the above method has another following benefit: when the target information is used for transmitting an uplink Hybrid Automatic Repeat request-Acknowledgment (HARQ-ACK) information set corresponding to all downlink schedulings in the K downlink signalings, the predefined criterion ensures that the HARQ-ACK information set is correctly received at the base station side.

In one embodiment, the above method has yet another following benefit: by designing a reasonable predefined criterion, for example, the target time-frequency resource is one of the K1 time-frequency resource(s) corresponding to a minimum Serving Cell Index (ServCellIndex), or the target time-frequency resource is one of the K1 time-frequency resource(s) corresponding to a minimum Bandwidth Part Indicator (BWP Indicator), or, for example, the target time-frequency resource is one earliest time-frequency resource located in time domain among the K1 time-frequency resource(s), the above approach may optimize the transmission of the target information from aspects such as reliability, timeliness and so on, thereby improving the overall performance of the system.

According to one aspect of the disclosure, the above method is characterized in that: the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one embodiment, the above method has the following benefits: when the first index is a minimum index among the K1 index(es), it is indicated that the frequency-domain resource corresponding to the first index is a frequency-domain resource of good channel conditions among the K1 time-frequency resource(s), thereby ensuring the robustness of the transmission of the target information.

According to one aspect of the disclosure, the above method is characterized in that: the K downlink signalings include K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

In one embodiment, the above method has the following benefits: the K1 downlink signaling(s) are used for indicating that the K1 time-frequency resource(s) (is)are of no-listening respectively, so that the K1 time-frequency resource(s) (is)are determined directly from the K time-frequency resources through the reception of the K1 downlink signaling(s), thus the complexity of reception of the UE is simplified.

According to one aspect of the disclosure, the above method includes:

judging whether listening is needed before a first time-frequency resource according to a first downlink signaling and a second downlink signaling.

Herein, the first time-frequency resource is one of the K time-frequency resources, the first downlink signaling is one of the K downlink signalings that indicates the first time-frequency resource; and the second downlink signaling is one of the K downlink signalings other than the first downlink signaling.

In one embodiment, the above method is characterized in that: when the second downlink signaling and the first downlink signaling have a predefined relationship, the second downlink signaling and the first downlink signaling are used together for determining whether the first time-frequency resource needs listening, thereby optimizing the transmission in the first time-frequency resource.

In one embodiment, the above method has the following benefits: for example, the first downlink signaling and the second downlink signaling are related to the first time-frequency resource simultaneously, the first downlink signaling indicates listening, the second downlink signaling indicates no-listening and the second downlink signaling is transmitted later, then the first time-frequency resource is considered to be of no-listening, so as to improve the feasibility of uplink transmission.

According to one aspect of the disclosure, the above method includes:

transmitting K1 radio signal(s) in the K1 time-frequency resource(s) respectively, one of the K1 radio signal(s) transmitted in the target time-frequency resource including the target information; and for any one of the K time-frequency resources other than the K1 time-frequency resource(s), performing listening to judge whether a channel is idle; if idle, transmitting a radio signal in the any one of the K time-frequency resources other than the K1 time-frequency resource(s); otherwise, giving up transmitting a radio signal in the any one of the K time-frequency resources other than the K1 time-frequency resource(s).

Herein, the K1 radio signal(s) is(are) directly transmitted without listening.

In one embodiment, the above method has the following benefits: after ensuring the target information is transmitted, the UE still performs listening to judge whether a channel is idle; if idle, the UE still transmits a radio signal in any one of the K time-frequency resources othe than the K1 time-frequency resource(s), thereby not only ensuring the transmission in the K1 time-frequency resource(s) indicated of no-listening, but also realizing as far as possible the transmission in the time-frequency resources indicated of listening other than the K1 time-frequency resource(s), so as to improve the overall performance of uplink.

The disclosure provides a method in a base station for wireless communication, wherein the method includes:

transmitting K downlink signalings, the K downlink signalings indicating K time-frequency resources respectively;

determining K1 time-frequency resource(s) from the K time-frequency resources, only the K1 time-frequency resource(s) among the K time-frequency resources needing no listening before wireless transmission therein; and receiving target information in a target time-frequency resource.

Herein, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

According to one aspect of the disclosure, the above method is characterized in that: the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

According to one aspect of the disclosure, the above method is characterized in that: the K downlink signalings include K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

According to one aspect of the disclosure, the above method includes:

detecting a radio signal in a first time-frequency resource.

Herein, the first time-frequency resource is one of the K time-frequency resources, a first downlink signaling is one of the K downlink signalings that indicates the first time-frequency resource; a second downlink signaling is one of the K downlink signalings other than the first downlink signaling; the first downlink signaling and the second downlink signaling are used for judging whether listening is needed before the first time-frequency resource; if judged to not listen, a first terminal transmits a radio signal in the first time-frequency resource; if judged to listen, the first terminal performs listening before the first time-frequency resource to judge whether a channel is idle and determines whether to transmit a radio signal in the first time-frequency resource; and a transmitter of the target information is the first terminal.

According to one aspect of the disclosure, the above method includes:

receiving K1 radio signal(s) in the K1 time-frequency resource(s) respectively, one of the K1 radio signal(s) transmitted in the target time-frequency resource including the target information; and detecting a radio signal in any one of the K time-frequency resources other than the K1 time-frequency resource(s).

Herein, the K1 radio signal(s) is(are) directly transmitted without listening; a channel is judged to be idle, and a radio signal is received in the any one of the K time-frequency resources other than the K1 time-frequency resource(s); or, a channel is judged to be not idle, and no radio signal is received in the any one of the K time-frequency resources other than the K1 time-frequency resource(s).

The disclosure provides a UE for wireless communication, wherein the UE includes:

a first receiver, to receive K downlink signalings, the K downlink signalings indicating K time-frequency resources respectively;

a first transceiver, to determine K1 time-frequency resource(s) from the K time-frequency resources, only the K1 time-frequency resource(s) among the K time-frequency resources needing no listening before wireless transmission therein; and a first transmitter, to transmit target information in a target time-frequency resource.

Herein, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the above UE for wireless communication is characterized in that: the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one embodiment, the above UE for wireless communication is characterized in that: the K downlink signalings include K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

In one embodiment, the above UE for wireless communication is characterized in that: the first transceiver further judges whether listening is needed before a first time-frequency resource according to a first downlink signaling and a second downlink signaling; the first time-frequency resource is one of the K time-frequency resources, the first downlink signaling is one of the K downlink signalings that indicates the first time-frequency resource; and the second downlink signaling is one of the K downlink signalings other than the first downlink signaling.

In one embodiment, the above UE for wireless communication is characterized in that: the first transceiver transmits K1 radio signal(s) in the K1 time-frequency resource(s) respectively, one of the K1 radio signal(s) transmitted in the target time-frequency resource including the target information; for any one of the K time-frequency resources other than the K1 time-frequency resource(s), the first transceiver performs listening to judge whether a channel is idle; if idle, the first transceiver transmits a radio signal in the any one of the K time-frequency resources other than the K1 time-frequency resource(s); otherwise, the first transceiver gives up transmitting a radio signal in the any one of the K time-frequency resources other than the K1 time-frequency resource(s); the K1 radio signal(s) is(are) directly transmitted without listening.

The disclosure provides a base station for wireless communication, wherein the base station includes:

a second transmitter, to transmit K downlink signalings, the K downlink signalings indicating K time-frequency resources respectively;

a second receiver, to determine K1 time-frequency resource(s) from the K time-frequency resources, only the K1 time-frequency resource(s) among the K time-frequency resources needing no listening before wireless transmission therein; and a third receiver, to receive target information in a target time-frequency resource.

Herein, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the above base station for wireless communication is characterized in that: the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one embodiment, the above base station for wireless communication is characterized in that: the K downlink signalings include K1 downlink signaling(s), the K1 downlink signaling(s) indicate(s) the K1 frequency-band resource(s) respectively; the K1 downlink signaling(s) indicate(s) no-listening respectively; and any one of the K downlink signalings other than the K1 downlink signaling(s) indicates listening.

In one embodiment, the above base station for wireless communication is characterized in that: the second receiver detects a radio signal in a first time-frequency resource; the first time-frequency resource is one of the K time-frequency resources, a first downlink signaling is one of the K downlink signalings that indicates the first time-frequency resource; a second downlink signaling is one of the K downlink signalings other than the first downlink signaling; the first downlink signaling and the second downlink signaling are used for judging whether listening is needed before the first time-frequency resource; if judged to not listen, a first terminal transmits a radio signal in the first time-frequency resource; if judged to listen, the first terminal performs listening before the first time-frequency resource to judge whether a channel is idle and determines whether to transmit a radio signal in the first time-frequency resource; and a transmitter of the target information is the first terminal.

In one embodiment, the above base station for wireless communication is characterized in that: the second receiver receives K1 radio signal(s) in the K1 time-frequency resource(s) respectively, one of the K1 radio signal(s) transmitted in the target time-frequency resource including the target information; the second receiver detects a radio signal in any one of the K time-frequency resources other than the K1 time-frequency resource(s); the K1 radio signal(s) is(are) directly transmitted without listening; the second receiver judges that a channel is idle, and the second receiver receives a radio signal in the any one of the K time-frequency resources other than the K1 time-frequency resource(s); or, the second receiver judges that a channel is not idle, and the second receiver receives no radio signal in the any one of the K time-frequency resources other than the K1 time-frequency resource(s).

In one embodiment, compared with conventional schemes, the disclosure has the following advantages.

When the UE has multiple uplink resources needing no listening, that is, corresponding to the K1 time-frequency resources in the above method, the UE determines the target time-frequency resource from the K1 time-frequency resources according to a predefined criterion, thereby ensuring that the target information transmitted in the target time-frequency resource can be correctly received by the base station; when the target information is used for transmitting a HARQ-ACK information set corresponding to all downlink schedulings in the K downlink signalings, the predefined criterion ensures that the HARQ-ACK information set is correctly received at the base station side.

When the first index is a minimum index among the K1 index(es), it is indicated that the frequency-domain resource corresponding to the first index is a frequency-domain resource of good channel conditions among the K1 time-frequency resource(s), thereby ensuring the robustness of the transmission of the target information.

When the second downlink signaling and the first downlink signaling have a predefined relationship, the second downlink signaling and the first downlink signaling are used together for determining whether the first time-frequency resource needs listening, thereby optimizing the transmission in the first time-frequency resource.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
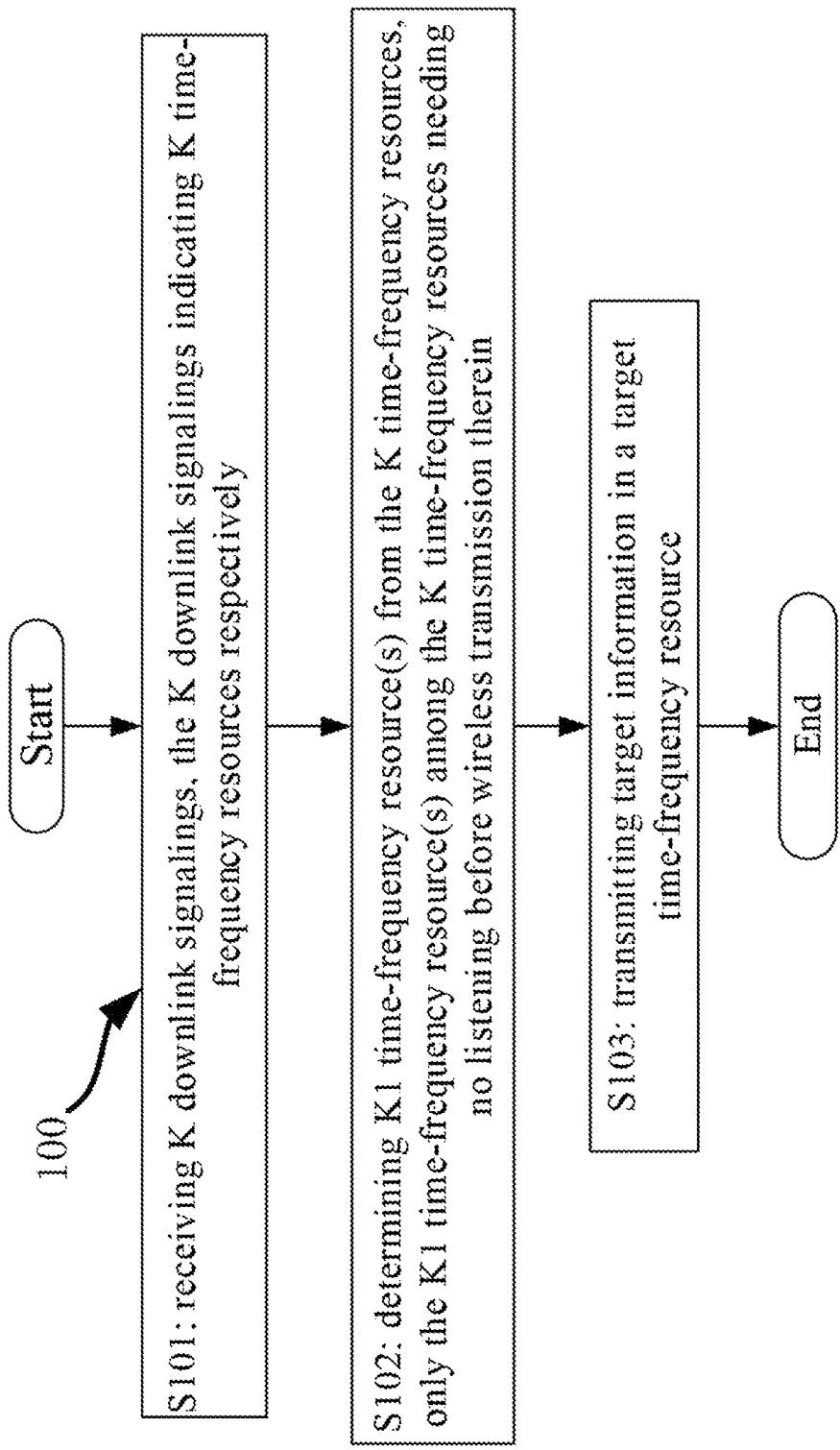
FIG. 1 is a flowchart of target information according to one embodiment of the disclosure.

Embodiment 1 illustrates an example of a flowchart of target information, as shown in FIG. 1. In 100 shown in FIG. 1, each box represents one step.

In Embodiment 1, the UE in the disclosure receives K downlink signalings in S101, the K downlink signalings indicating K time-frequency resources respectively, determines K1 time-frequency resource(s) from the K time-frequency resources in S102, only the K1 time-frequency resource(s) among the K time-frequency resources needing no listening before wireless transmission therein, and transmits target information in a target time-frequency resource in S103. The target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the UE needs to perform listening before wireless transmission in any one of the K time-frequency resources other than the K1 time-frequency resource(s).

In one embodiment, the predefined criterion includes: if the K1 is greater than 1, no downlink signaling is needed to indicate the target time-frequency resource explicitly from the K1 time-frequency resources.

In one embodiment, the predefined criterion includes: if the K1 is equal to 1, the target time-frequency resource is the K1 time-frequency resource.

In one embodiment, in addition to a downlink signaling indicating the target time-frequency resource, at least one of the K downlink signalings is used for triggering the target information.

In one embodiment, the target information includes HARQ-ACK information; and the HARQ-ACK information in the target information is associated to downlink data scheduled by at least one of the K downlink signalings other than the downlink signaling indicating the target time-frequency resource.

In one embodiment, the target information is a UCI.

In one embodiment, the target information includes at least one of Channel State Information (CSI), HARQ-ACK information and a Scheduling Request (SR).

In one embodiment, the target information includes HARQ-ACK information only.

In one embodiment, the K downlink signalings include K3 downlink scheduling(s), HARQ-ACK information included in the target information is HARQ-ACK information corresponding to the K3 downlink scheduling(s), and the K3 is a positive integer less than the K.

In one subembodiment, the HARQ-ACK information includes K3 bit(s), and the K3 bit(s) correspond to the K3 downlink scheduling(s) respectively.

In one subembodiment, the HARQ-ACK information includes 1 bit only, and the 1 bit corresponds to the K3 downlink scheduling(s).

In one embodiment, the downlink data is transmitted on a Physical Downlink Shared Channel (PDSCH).

In one embodiment, the K time-frequency resources are all allocated to a Physical Uplink Shared Channel (PUSCH).

In one embodiment, any one of the K time-frequency resources is allocated to a PUSCH or a Physical Uplink Control Channel (PUCCH).

In one embodiment, each of the K downlink signalings is used for triggering transmission of the target information.

In one embodiment, any two of the K time-frequency resources are overlapping in time domain.

In one embodiment, the phrase that two time-frequency resources are overlapping in time domain in the disclosure refers that: a given multicarrier symbol belongs simultaneously to time-domain resources respectively occupied by the two time-frequency resources.

In one embodiment, any two of the K time-frequency resources are not overlapping in frequency domain.

In one embodiment, any two of the K time-frequency resources are orthogonal in frequency domain.

In one embodiment, the multicarrier symbol in the disclosure is an Orthogonal Frequency Division Multiplexing (OFDM) symbol.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (Filter Bank Multi Carrier) symbol.

In one embodiment, the multicarrier symbol in the disclosure is an OFDM symbol including a Cyclic Prefix (CP).

In one embodiment, the multicarrier symbol in the disclosure is one of Discrete Fourier Transform Spreading Orthogonal Frequency Division Multiplexing (DFT-s-OFDM) symbols including CPs.

In one embodiment, the K downlink signalings are all Downlink Control Information (DCI) used for downlink scheduling.

In one embodiment, the K downlink signalings are all downlink grants.

In one embodiment, the K downlink signalings are all DCIs used for uplink scheduling.

In one embodiment, the K downlink signalings are all used for uplink grant.

In one embodiment, a format of the DCI used for uplink grant in the disclosure includes an LTE DCI format 0 and an LTE DCI format 4.

In one embodiment, a format of the DCI used for uplink grant in the disclosure includes an NR DCI format 0_0 and an NR DCI format 0_1.

In one embodiment, the K time-frequency resources are all reserved to uplink transmission.

In one embodiment, time-domain resources occupied by any one of the K downlink signalings belong to a target time window, the target time window has a duration in time domain less than a target threshold, and the target threshold is predefined or the target threshold is configured through a higher-layer signaling; and the target threshold is in unit of ms.

In one embodiment, the CSI in the disclosure includes at least one of Channel Quality Information (CQI), a Precoding Matrix Indicator (PMI), a Rank Indicator (RI), a Sounding Reference Signal Resource Indicator (SRI), a Channel State Information Reference Signal Resource Indicator (CRI) and a Reference Signal Received Power (RSRP).

In one embodiment, the phrase that the target time-frequency resource is one of the K1 time-frequency resource(s) determined according to a predefined criterion refers that: the target time-frequency resource is an earliest time-domain resource located in time domain among the K1 time-frequency resource(s).

In one embodiment, the phrase that the target time-frequency resource is one of the K1 time-frequency resource(s) determined according to a predefined criterion refers that: the target time-frequency resource is indicated through a target downlink signaling, the K1 time-frequency resource(s) (is)are indicated through K1 downlink signaling(s), and the target downlink signaling is an earliest downlink signaling received by the UE among the K1 downlink signaling(s).

In one embodiment, the phrase that the target time-frequency resource is one of the K1 time-frequency resource(s) determined according to a predefined criterion refers that: the target time-frequency resource is indicated through a target downlink signaling, the K1 time-frequency resource(s) (is)are indicated through K1 downlink signaling(s), and the target downlink signaling is an earliest downlink signaling transmitted by the base station among the K1 downlink signaling(s).

In one embodiment, the phrase that the target time-frequency resource is one of the K1 time-frequency resource(s) determined according to a predefined criterion refers that: the K1 time-frequency resource(s) correspond to K1 center frequency(frequencies) respectively, the target time-frequency resource corresponds to a first center frequency; the first center frequency is a minimum one among the K1 center frequency(frequencies), or the first center frequency is a maximum one among the K1 center frequency(frequencies).

In one embodiment, any two of the K1 time-frequency resource(s) (is)are overlapping in time domain.

In one embodiment, the target time-frequency resource occupies a positive integer number of Resource Elements (REs).

In one embodiment, the target time-frequency resource occupies a positive integer number of multicarrier symbols in time domain, and the target time-frequency resource occupies a frequency-domain resource corresponding to a positive integer number of Resource Blocks (RBs) in frequency domain.

In one embodiment, the target time-frequency resource includes multiple subcarrier groups in frequency domain, any two of the multiple subcarrier groups are inconsecutive in frequency domain, and any one of the multiple subcarrier groups includes a positive integer number of consecutive subcarriers.

In one subembodiment, any two of the multiple subcarrier groups have an equal frequency-domain interval therebetween.

In one subembodiment, any two of the multiple subcarrier groups include a same number of subcarriers.

Embodiment 2

Figure 2:
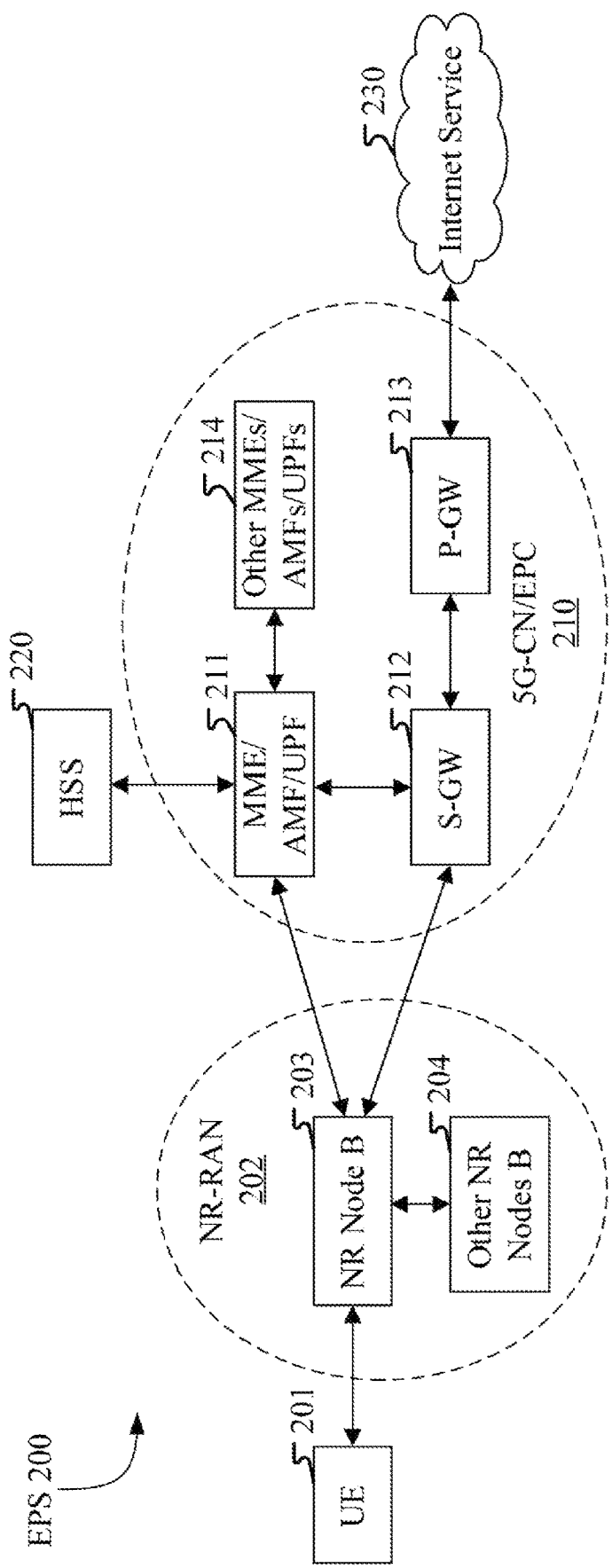
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

In one embodiment, the UE 201 supports wireless communication on unlicensed spectrum.

In one embodiment, the gNB 203 supports wireless communication on unlicensed spectrum.

In one embodiment, the UE 201 supports LBT.

In one embodiment, the gNB 203 supports LBT.

In one embodiment, the UE 201 supports transmission on multiple CCs simultaneously.

In one embodiment, the UE 201 supports transmission on multiple BWPs simultaneously.

In one embodiment, the gNB 203 supports transmission on multiple CCs simultaneously.

In one embodiment, the gNB 203 supports transmission on multiple BWPs simultaneously.

Embodiment 3

Figure 3:
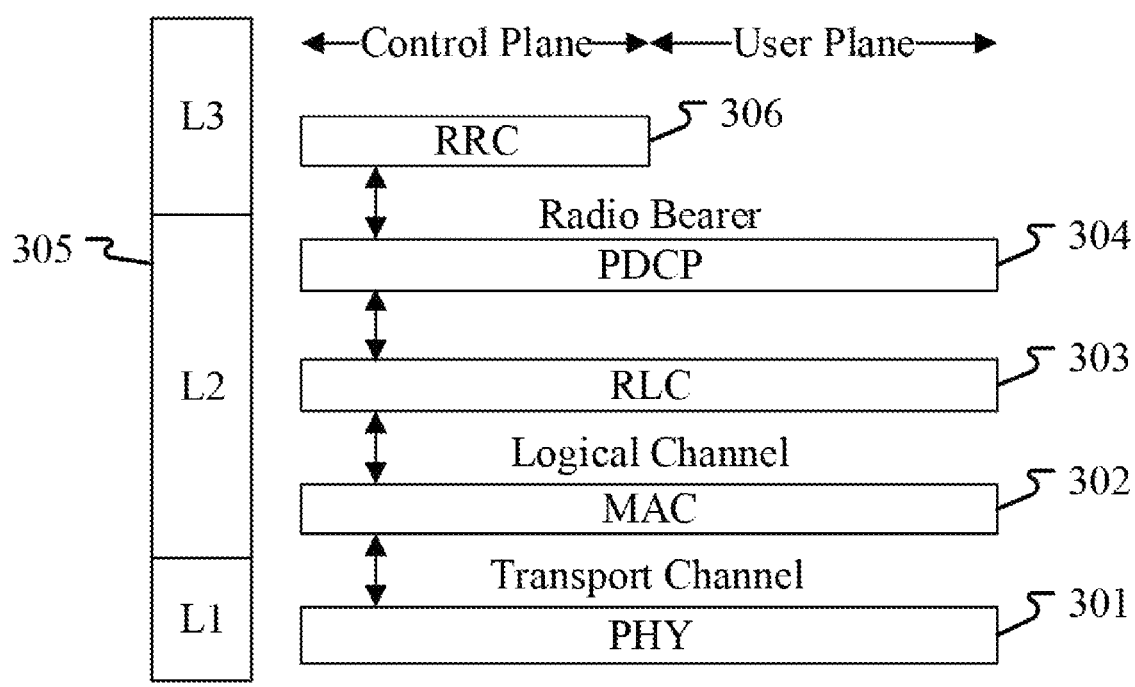
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the eNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the eNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between eNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the eNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the eNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, any one of the K downlink signalings in the disclosure is generated by the PHY 301.

In one embodiment, the first downlink signaling in the disclosure is generated by the PHY 301.

In one embodiment, the second downlink signaling in the disclosure is generated by the PHY 301.

In one embodiment, the listening in the disclosure is performed by the PHY 301.

In one embodiment, any one of the K1 radio signal(s) in the disclosure is generated by the MAC sublayer 302.

In one embodiment, the radio signal transmitted in any one of the K time-frequency resources other than the K1 time-frequency resource(s) in the disclosure is generated by the MAC sublayer 302.

In one embodiment, the target information in the disclosure is generated by the MAC sublayer 302.

Embodiment 4

Figure 4:
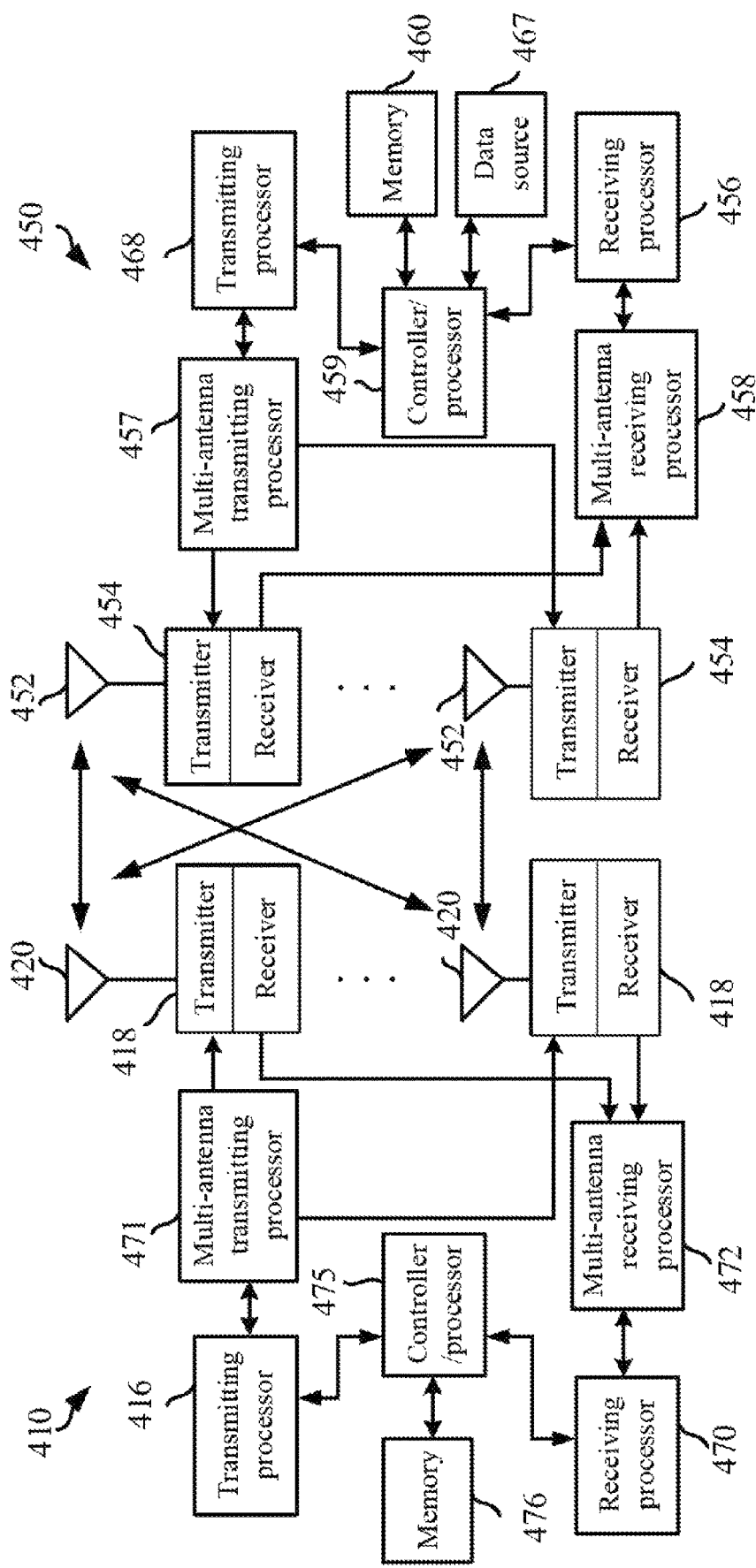
FIG. 4 is a diagram illustrating an evolved node B and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides functions of Layer 2. In downlink transmission, the controller/processor 475 provides header compression, encryption, packet segmentation and reordering, multiplexing between a logical channel and a transport channel, and a radio resource allocation for the UE 450 based on various priority metrics. The controller/processor 475 is also in charge of HARQ operation, retransmission of lost packets, and signalings to the UE 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding/beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In DL transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In Uplink (UL) transmission, at the UE 450, the data source 467 provides a higher-layer packet to the controller/processor 459. The data source 467 illustrates all protocol layers above the L2 layer. Similar as the transmitting function of the gNB 410 described in DL transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In UL transmission, the function of the gNB 410 is similar as the receiving function of the UE 450 described in the DL transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In UL transmission, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least: receives K downlink signalings, the K downlink signalings indicating K time-frequency resources respectively; determines K1 time-frequency resource(s) from the K time-frequency resources, only the K1 time-frequency resource(s) among the K time-frequency resources needing no listening before wireless transmission therein; and transmits target information in a target time-frequency resource; wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the UE 450 includes a memory that stores a computer readable instruction program. The computer readable instruction program generates an action when executed by at least one processor. The action includes: receiving K downlink signalings, the K downlink signalings indicating K time-frequency resources respectively; determining K1 time-frequency resource(s) from the K time-frequency resources, only the K1 time-frequency resource(s) among the K time-frequency resources needing no listening before wireless transmission therein; and transmitting target information in a target time-frequency resource; wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the gNB 410 includes at least one processor and at least one memory. The at least one memory includes computer program codes. The at least one memory and the computer program codes are configured to be used in collaboration with the at least one processor. The gNB 410 at least: transmits K downlink signalings, the K downlink signalings indicating K time-frequency resources respectively; determines K1 time-frequency resource(s) from the K time-frequency resources, only the K1 time-frequency resource(s) among the K time-frequency resources needing no listening before wireless transmission therein; and receives target information in a target time-frequency resource; wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the gNB 410 includes a memory that stores a computer readable instruction program. The computer readable instruction program generates an action when executed by at least one processor. The action includes: transmitting K downlink signalings, the K downlink signalings indicating K time-frequency resources respectively; determining K1 time-frequency resource(s) from the K time-frequency resources, only the K1 time-frequency resource(s) among the K time-frequency resources needing no listening before wireless transmission therein; and receiving target information in a target time-frequency resource; wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the UE 450 corresponds to the UE in the present disclosure.

In one embodiment, the gNB 410 corresponds to the base station in the present disclosure.

In one embodiment, at least one of the antenna 452, the receiver 454, the multi-antenna receiving processor 458 and the receiving processor 456 is used for receiving the K downlink signalings in the disclosure; and at least one of the antenna 420, the transmitter 418, the multi-antenna transmitting processor 471 and the transmitting processor 416 is used for transmitting the K downlink signalings in the disclosure.

In one embodiment, at least one of the antenna 452, the receiver 454, the multi-antenna receiving processor 458, the receiving processor 456 and the controller/processor 459 is used for determining the K1 time-frequency resource(s) in the disclosure from the K time-frequency resources in the disclosure; and at least one of the antenna 420, the transmitter 418, the multi-antenna transmitting processor 471, the transmitting processor 416 and the controller/processor 475 is used for determining the K1 time-frequency resource(s) in the disclosure from the K time-frequency resources in the disclosure.

In one embodiment, at least one of the antenna 452, the transmitter 454, the multi-antenna transmitting processor 457 and the transmitting processor 468 is used for transmitting the target information in the disclosure in the target time-frequency resource in the disclosure; and at least one of the antenna 420, the receiver 418, the multi-antenna receiving processor 472 and the receiving processor 470 is used for receiving the target information in the disclosure in the target time-frequency resource in the disclosure.

In one embodiment, at least one of the antenna 452, the receiver 454, the multi-antenna receiving processor 458, the receiving processor 456 and the controller/processor 459 is used for judging whether listening is needed before the first time-frequency resource in the disclosure according to the first downlink signaling in the disclosure and the second downlink signaling in the disclosure.

In one embodiment, at least one of the antenna 420, the receiver 418, the multi-antenna receiving processor 472 and the receiving processor 470 is used for detecting a radio signal in the first time-frequency resource in the disclosure.

In one embodiment, at least one of the antenna 452, the transmitter 454, the multi-antenna transmitting processor 457 and the transmitting processor 468 is used for transmitting the K1 radio signal(s) in the disclosure in the K1 time-frequency resource(s) in the disclosure respectively; and one of the K1 radio signal(s) transmitted in the target time-frequency resource includes the target information.

In one embodiment, for any one of the K time-frequency resources other than the K1 time-frequency resource(s), at least one of the antenna 452, the receiver 454, the multi-antenna receiving processor 458, the receiving processor 456 and the controller/processor 459 is used for performing listening to judge whether a channel is idle; if idle, at least one of the antenna 452, the transmitter 454, the multi-antenna transmitting processor 457, the transmitting processor 468 and the controller/processor 459 is used for transmitting a radio signal in the any one of the K time-frequency resources in the disclosure other than the K1 time-frequency resource(s) in the discourse; otherwise, at least one of the antenna 452, the transmitter 454, the multi-antenna transmitting processor 457, the transmitting processor 468 and the controller/processor 459 is used for giving up transmitting a radio signal in the any one of the K time-frequency resources in the disclosure other than the K1 time-frequency resource(s) in the disclosure.

In one embodiment, at least one of the antenna 420, the receiver 418, the multi-antenna receiving processor 472 and the receiving processor 470 is used for receiving the K1 radio signal(s) in the disclosure in the K1 time-frequency resource(s) in the disclosure respectively.

In one embodiment, at least one of the antenna 420, the receiver 418, the multi-antenna receiving processor 472 and the receiving processor 470 is used for detecting a radio signal in any one of the K time-frequency resources in the disclosure other than the K1 time-frequency resource(s) in the disclosure.

Embodiment 5

Figure 5:
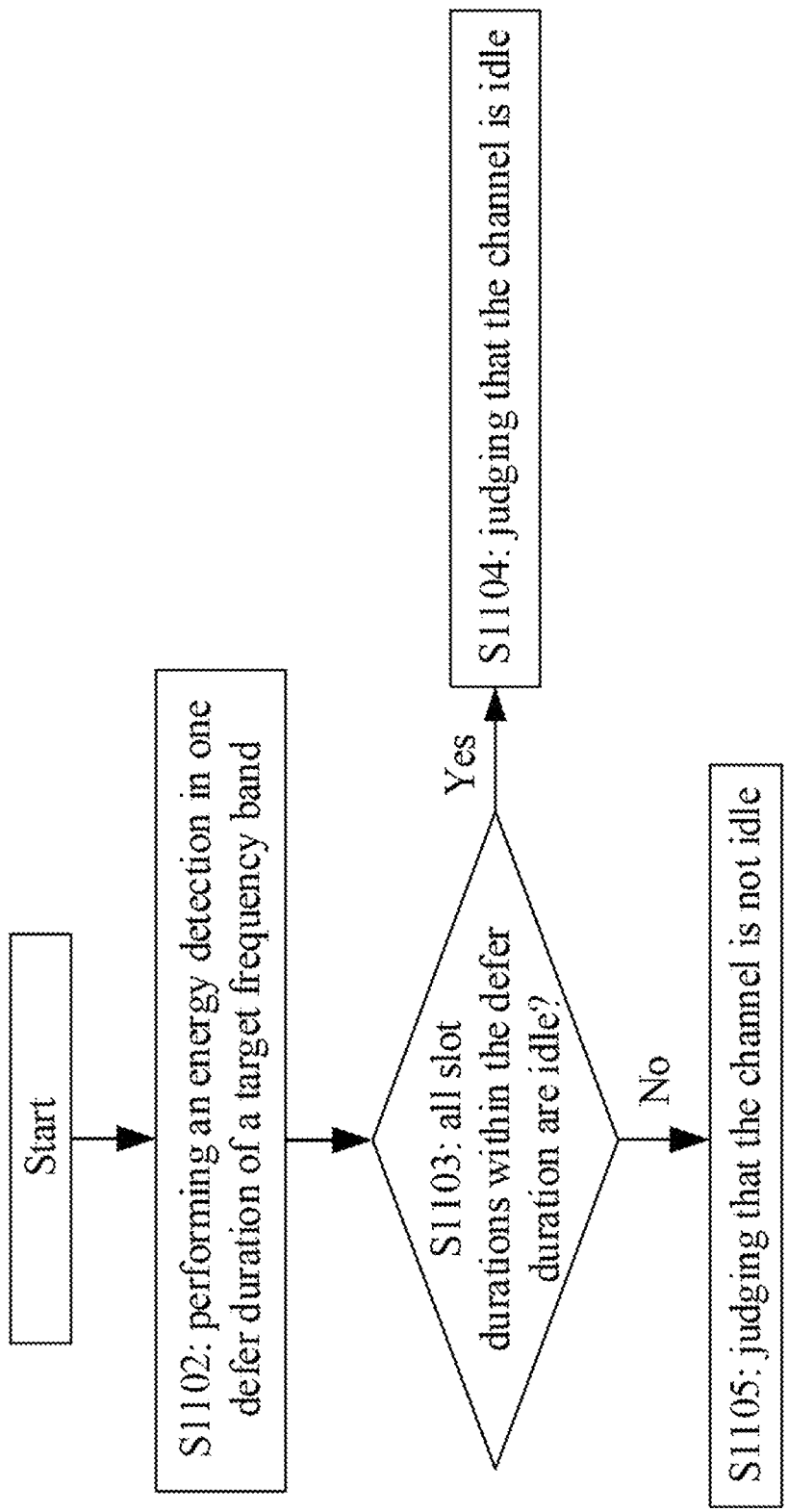
FIG. 5 is a flowchart of one-shot listening according to one embodiment of the disclosure.

Embodiment 5 illustrates an example of a flowchart of one-shot listening, as shown in FIG. 5.

A UE performs an energy detection in one defer duration of a target frequency band in S1102; judges whether all slot durations within the defer duration are idle in S1103; if idle, considers the channel is idle in S1104; otherwise, considers the channel is not idle in S1105.

In one embodiment, the first time-frequency resource in the disclosure belongs to the defer duration in time domain.

In one embodiment, the first time-frequency resource in the disclosure belongs to the target frequency band in frequency domain.

In one embodiment, any one of the K time-frequency resources other than the K1 time-frequency resource(s) in the disclosure belongs to the defer duration in time domain.

In one embodiment, any one of the K time-frequency resources other than the K1 time-frequency resource(s) in the disclosure belongs to the target frequency band in frequency domain.

In one embodiment, the defer duration is 25 us.

In one embodiment, the defer duration is not greater than 25 us.

In one embodiment, the defer duration is not less than 16 us.

In one embodiment, the defer duration is fixed.

In one embodiment, each slot duration in the defer duration is 9 us.

In one embodiment, each slot duration in the defer duration is not greater than 9 us.

In one embodiment, each slot duration in the defer duration is not less than 4 us.

In one embodiment, all slot durations in the defer duration are equal.

In one embodiment, the defer duration is successively divided into a positive integer number of slot durations and one time slice from front to rear, and the time slice has a duration less than the slot duration.

In one embodiment, the target frequency band is one BWP.

In one embodiment, the target frequency band is one carrier.

In one embodiment, in S1103, for any one slot duration within the defer duration, if a received power is greater than a specific threshold, the channel in the any one slot duration is considered not idle; if a received power is not greater than a specific threshold, the channel in the any one slot duration is considered idle.

In one embodiment, in S1103, for any one slot duration within the defer duration, if a received power is not less than a specific threshold, the channel in the any one slot duration is considered not idle; if a received power is less than a specific threshold, the channel in the any one slot duration is considered idle.

In one embodiment, the specific threshold is −72 dBm.

In one embodiment, the specific threshold is configurable (that is, related to a downlink signaling).

In one embodiment, the specific threshold is related to a maximum transmit power of the UE.

Embodiment 6

Figure 6:
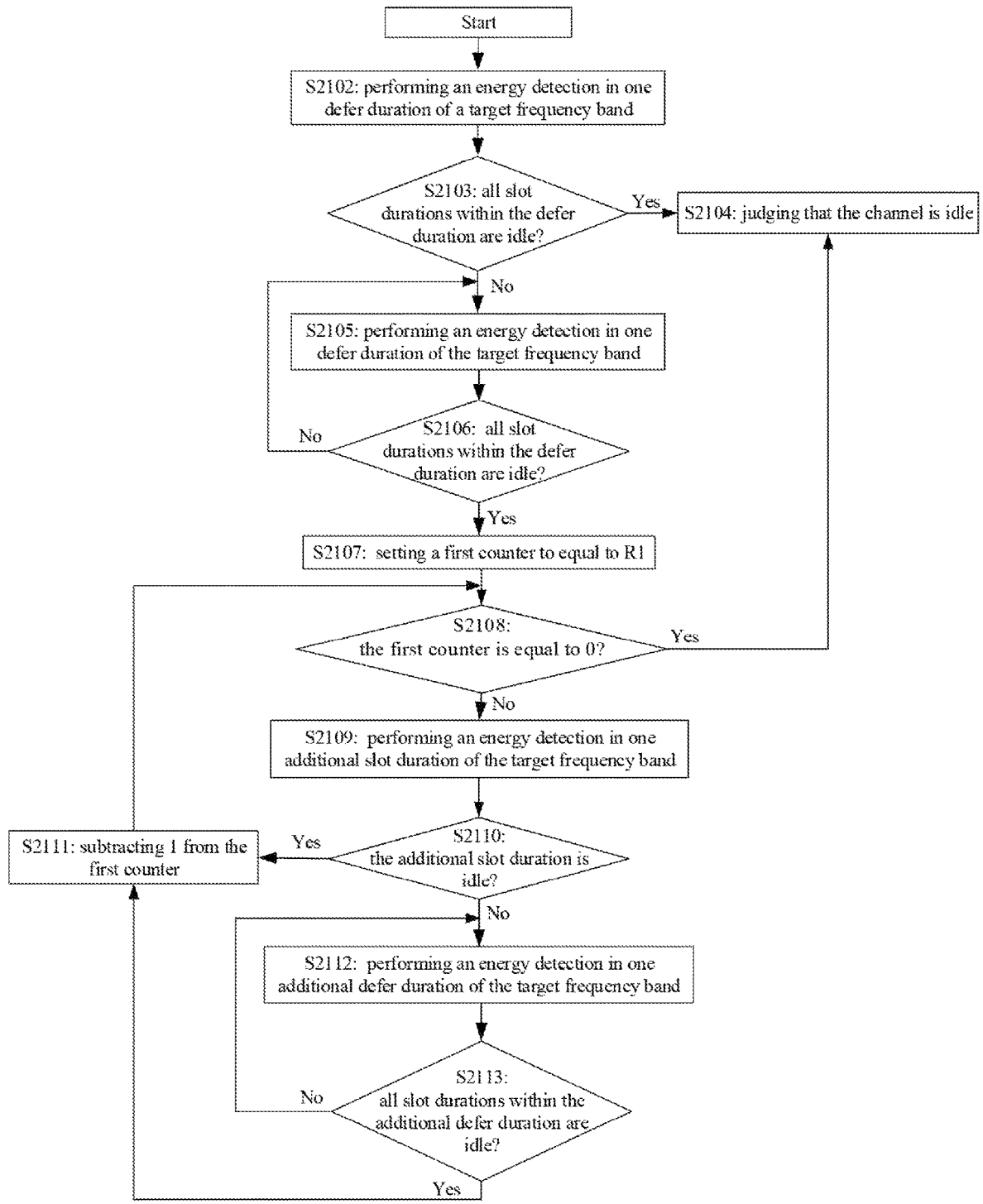
FIG. 6 is a flowchart of multi-shot listening according to one embodiment of the disclosure.

Embodiment 6 illustrates an example of a flowchart of multi-shot listening, as shown in FIG. 6.

A UE performs an energy detection in one defer duration of a target frequency band in S2102; judges whether all slot durations within the defer duration are idle in S2103, if idle, goes to S2104 to consider the channel is idle, otherwise, goes to S2105 to perform an energy detection in one defer duration of the target frequency band; judges whether all slot durations within the defer duration are idle in S2106, if idle, goes to S2107 to set a first counter to equal to R1, otherwise, returns to S2105; judges whether the first counter is equal to 0 in S2108, if idle, goes to S2104, otherwise, goes to S2109 to perform an energy detection in one additional slot duration of the target frequency band; judges whether the additional slot duration is idle in S2110, if idle, goes to S2111 to subtract 1 from the first counter, and then returns to S2108, otherwise, goes to S2112 to perform an energy detection in one additional defer duration of the target frequency band; judges whether all slot durations within the additional defer duration are idle in S2113, if idle, goes to S2111, otherwise, returns to S2112.

In one embodiment, if the above S2104 cannot be performed yet before the start time of the time-frequency resource indicated by the second downlink signaling in the disclosure, the UE judges that the channel is not idle.

In one embodiment, if the above S2104 cannot be performed yet before the end time of the first time-frequency resource in the disclosure, the UE judges that the channel is not idle.

Embodiment 7

Figure 7:
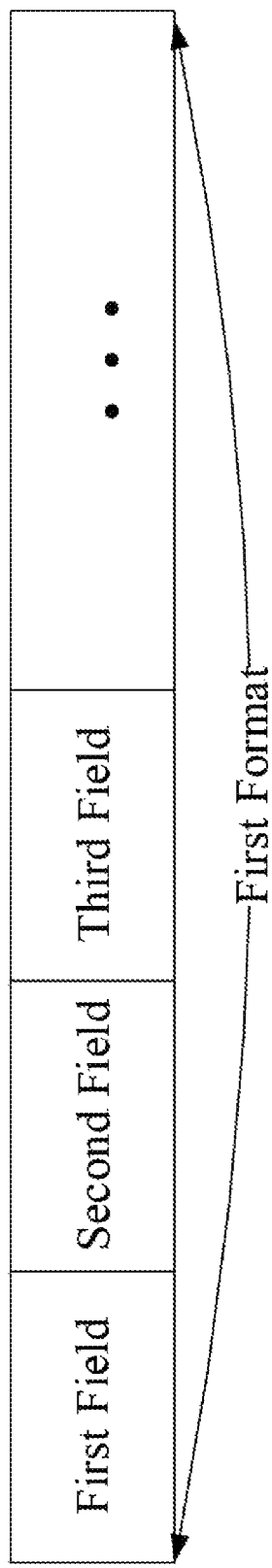
FIG. 7 is a diagram illustrating a first format according to one embodiment of the disclosure.

Embodiment 7 illustrates an example of a diagram of a first format, as shown in FIG. 7. In Embodiment 7, the first format includes multiple fields, such as a first field, a second field, a third field, etc., wherein each field is composed of a positive integer number of bits.

In one embodiment, any one of the K downlink signalings in the disclosure employs the first format.

In one embodiment, any one of the K1 downlink signaling(s) in the disclosure employs the first format.

In one embodiment, the first downlink signaling in the disclosure employs the first format.

In one embodiment, the second downlink signaling in the disclosure employs the first format.

In one embodiment, the first format is a DCI format used for uplink grant.

In one embodiment, the DCI format used for uplink grant includes partial fields in LTE DCI Format 0.

In one embodiment, the DCI format used for uplink grant includes all fields in NR DCI format 0_0.

In one embodiment, the DCI format used for uplink grant includes partial fields in NR DCI format 0_0.

In one embodiment, the DCI format used for uplink grant includes all fields in NR DCI format 0_1.

In one embodiment, the DCI format used for uplink grant includes partial fields in NR DCI format 0_1.

In one subembodiment, the first format includes a Modulation and Coding Status (MCS) field, a HARQ process number field, a Redundancy Version (RV) field and a New Data Indicator (NDI) field.

In one subembodiment, two fields in the first format indicate time-domain resources and frequency-domain resources respectively.

In one embodiment, the first format is one RRC Information Element (IE).

In one embodiment, the first format is one MAC Control Element (CE).

In one embodiment, the first format is applied to the first downlink signaling in the disclosure, the first format is applied to the second downlink signaling in the disclosure, the first downlink signaling is used for indicating the first time-frequency resource in the disclosure, and the second signaling is used for indicating the second time-frequency resource in the disclosure; a resource occupied by the first time-frequency resource in time domain is overlapping with a resource occupied by the second time-frequency resource in time domain.

In one embodiment, one field in the first format indicates one listening type from X listening types, wherein the X is a positive integer greater than 1; one of the X listening types is no-listening, and any one of the X listening types other than the no-listening is one type of LBT.

In one embodiment, the first downlink signaling indicates no-listening from the X listening types, and one listening type indicated by the second downlink signaling is one of the X listening types other than the no-listening.

In one embodiment, the second downlink signaling indicates no-listening from the X listening types, and one listening type indicated by the first downlink signaling is one of the X listening types other than the no-listening.

In one embodiment, one of the X listening types is a one-shot LBT.

In one embodiment, one of the X listening types is a multi-shot LBT.

In one embodiment, the one-shot LBT is Category 2 LBT.

In one embodiment, the multi-shot LBT is Category 4 LBT.

In one embodiment, the X listening types include a one-shot LBT and a multi-shot LBT.

In one embodiment, the listening is the one listening type indicated by the first downlink signaling.

In one embodiment, the listening is the one listening type indicated by the second downlink signaling.

In one embodiment, the listening is one type of LBT.

Embodiment 8

Figure 8:
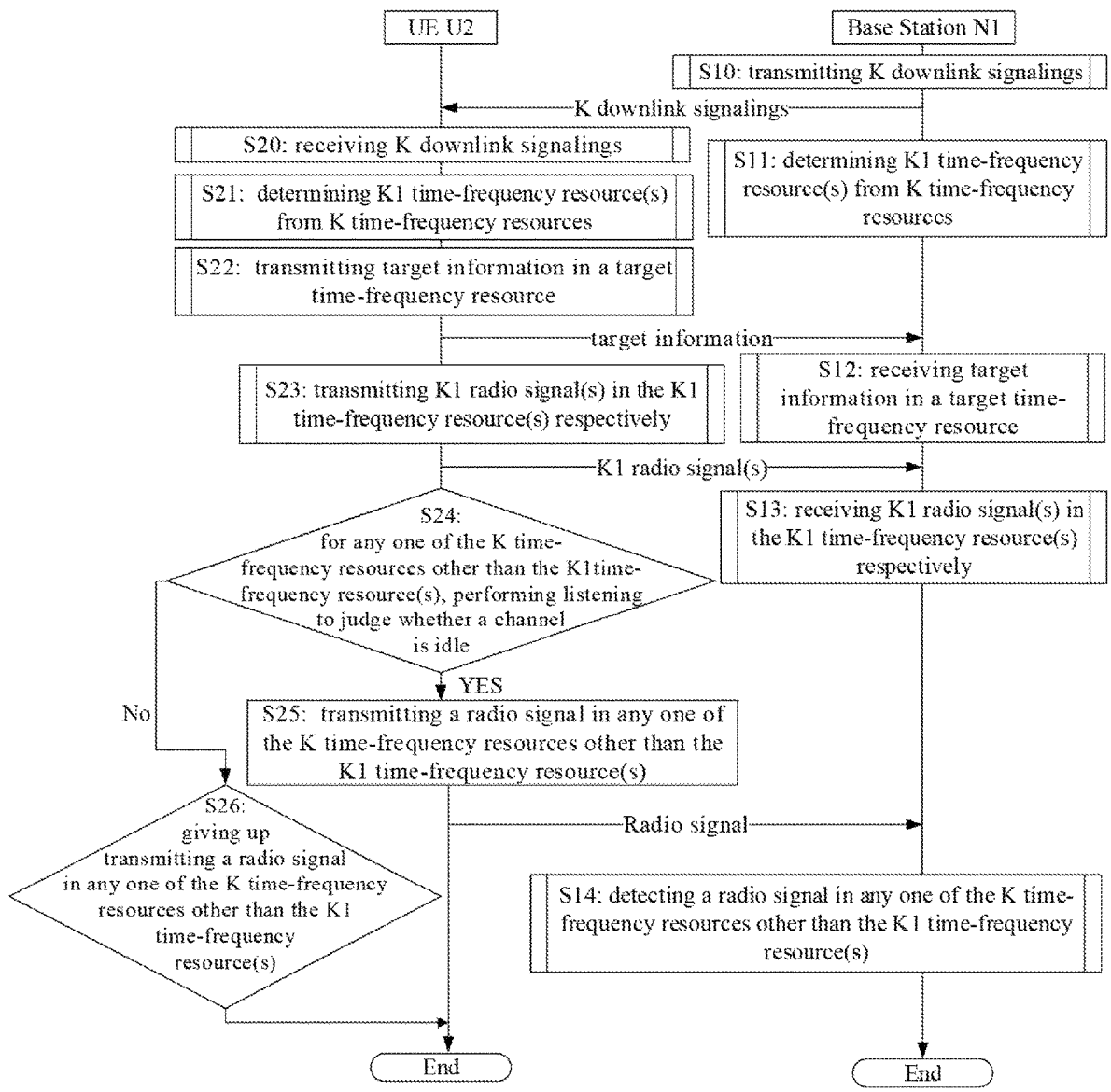
FIG. 8 is a flowchart of uplink transmission according to one embodiment of the disclosure.

Embodiment 8 illustrates an example of a flowchart of uplink transmission, as shown in FIG. 8. In FIG. 8, a base station N1 is a maintenance base station for a serving cell of a UE U2. Steps in boxes F0 and F1 shown in FIG. 8 are optional.

The base station N1 transmits K downlink signalings in S10, determines K1 time-frequency resource(s) from the K time-frequency resources in S11, receives target information in a target time-frequency resource in S12, receives K1 radio signal(s) in the K1 time-frequency resource(s) respectively in S13, and detects a radio signal in any one of the K time-frequency resources other than the K1 time-frequency resource(s) in S14.

The UE U2 receives K downlink signalings in S20, determines K1 time-frequency resource(s) from the K time-frequency resources in S21, transmits target information in a target time-frequency resource in S22, transmits K1 radio signal(s) in the K1 time-frequency resource(s) respectively in S23, and, for any one of the K time-frequency resources other than the K1 time-frequency resource(s), performs listening to judge whether a channel is idle in S24, if idle, transmits a radio signal in the any one of the K time-frequency resources other than the K1 time-frequency resource(s) in S25, otherwise, gives up transmitting a radio signal in the any one of the K time-frequency resources other than the K1 time-frequency resource(s) in S26.

In Embodiment 8, the K downlink signalings indicate K time-frequency resources respectively; only the K1 time-frequency resource(s) among the K time-frequency resources need no listening before wireless transmission therein, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum; one of the K1 radio signal(s) transmitted in the target time-frequency resource includes the target information; and the K1 radio signal(s) is(are) directly transmitted without listening.

In one embodiment, the phrase that the target time-frequency resource is one of the K1 time-frequency resource(s) determined according to a predefined criterion refers to that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one subembodiment, the frequency-band resource to which the target time-frequency resource belongs is a first CC, and the first index is a ServCellIndex corresponding to the first CC; the K1 frequency-band resource(s) (is)are K1 CC(s) respectively, and the K1 index(es) are K1 ServCellIndex(es) corresponding to the K1 CC(s) respectively.

In one subembodiment, the frequency-band resource to which the target time-frequency resource belongs is a first BWP, and the first index is a BWP indicator corresponding to the first BWP; the K1 frequency-band resource(s) (is)are K1 BWP(s) respectively, and the K1 index(es) are K1 BWP indicator(s) corresponding to the K1 BWP(s) respectively.

In one embodiment, any one of the K downlink signalings indicates one listening type from X listening types, and only one of the X listening types is no-listening, wherein the X is a positive integer greater than 1.

In one embodiment, the X listening types include at least one one-shot LBT.

In one embodiment, the X listening types include at least one multi-shot LBT.

In one embodiment, the one-shot LBT in the disclosure is Category 2 LBT.

In one embodiment, the multi-shot LBT in the disclosure is Category 4 LBT.

In one embodiment, the K downlink signalings include K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

In one subembodiment, each of the K1 downlink signaling(s) indicates no-listening from the X listening types.

In one subembodiment, any one of the K downlink signalings other than the K1 downlink signaling(s) indicates one of the X listening types in the disclosure other than no-listening.

In one subembodiment, the K1 is equal to 1, the K downlink signalings include only one downlink signaling used for indicating no-listening, and the downlink signaling used for indicating no-listening is used for indicating the target time-frequency resource.

In one embodiment, the phrase that giving up transmitting a radio signal in the any one of the K time-frequency resources other than the K1 time-frequency resource(s) includes: deferring transmitting a bit block carried by a corresponding radio signal.

In one embodiment, the phrase that giving up transmitting a radio signal in the any one of the K time-frequency resources other than the K1 time-frequency resource(s) includes: clearing a target cache, wherein the target cache stores a bit block of a corresponding radio signal.

In one embodiment, the phrase that giving up transmitting a radio signal in the any one of the K time-frequency resources other than the K1 time-frequency resource(s) includes: avoiding occupying the any one of the K time-frequency resources other than the K1 time-frequency resource(s) through a puncturing method.

In one embodiment, the K1 downlink signaling(s) include configuration information of the K1 radio signal(s) respectively.

In one subembodiment, the configuration information includes at least one of occupied frequency-domain resources, an MCS, an RV, a HARQ process number and an NDI.

In one embodiment, if a radio signal is transmitted in the any one of the K time-frequency resources other than the K1 time-frequency resource(s), a downlink signaling among the K downlink signalings that indicates the any one of the K time-frequency resources other than the K1 time-frequency resource(s) includes corresponding configuration information.

In one embodiment, the K1 radio signal(s) are all transmitted on a PUSCH.

In one embodiment, at least one of the K1 radio signal(s) is transmitted on a PUSCH.

In one embodiment, a target downlink signaling is a downlink signaling among the K downlink signalings that indicates the target time-frequency resource, a radio signal transmitted in the target time-frequency resource is a target radio signal, the target downlink signaling schedules the target radio signal, the target radio signal and the target information together occupy the target time-frequency resource.

In one subembodiment, the target information is mapped to the target time-frequency resource by way of puncturing in the target radio signal.

In one subembodiment, a position of a modulation symbol set generated by the target information in the target time-frequency resource is predefined.

In one subembodiment, the target information includes HARQ-ACK information only.

In one subembodiment, the target information includes a Scheduling Request (RS) only.

In one subembodiment, the target information includes HARQ-ACK information and an RS only.

In one embodiment, the target information is mapped to the time-frequency resource by way of rate-matching.

In one subembodiment, the target downlink signaling is used for scheduling a first bit block, the first bit block and the target information are used for jointly generating the target radio signal.

In one subembodiment, a physical layer channel occupied by the target radio signal is a PUSCH.

In one subembodiment, a transport channel occupied by the target radio signal is an Uplink Shared Channel (UL-SCH).

In one subembodiment, the target radio signal includes a Sounding Reference Signal (SRS).

In one subembodiment, the target radio signal includes a Demodulation Reference Signal (DMRS).

In one subembodiment, the target radio signal occupies all REs in the target time-frequency resource.

In one subembodiment, the target radio signal occupies partial REs in the target time-frequency resource.

In one embodiment, the K downlink signalings include K3 downlink scheduling(s), HARQ-ACK information included in the target information is HARQ-ACK information corresponding to the K3 downlink scheduling(s), the K3 is a positive integer less than the K, the K3 downlink scheduling(s) include(s) a candidate downlink signaling, and the candidate downlink signaling is used for triggering transmission of the target information.

In one subembodiment, the candidate downlink signaling is a latest downlink signaling transmitted in time domain among the K3 downlink signaling(s).

In one subembodiment, the candidate downlink signaling is a latest downlink signaling received in time domain among the K3 downlink signaling(s).

In one subembodiment, time-domain resources occupied by any one of the K3 downlink signaling(s) belong to a target time window, the target time window has a duration in time domain less than a target threshold, the target threshold is predefined or the target threshold is configured through a higher-layer signaling.

In one subembodiment, the K3 is equal to 1, the K is equal to 2, the K downlink signalings include one downlink signaling used for indicating no-listening and one downlink signaling used for indicating listening only, the one downlink signaling used for indicating no-listening is the target downlink signaling in the disclosure, and the one downlink signaling used for indicating listening is the candidate downlink signaling.

In one subembodiment, the phrase that the candidate downlink signaling triggers transmission of the target information includes: the UE receives the candidate downlink signaling, and the UE transmits the target information in the target time-frequency resource.

In one affiliated embodiment of the above subembodiment, the candidate downlink signaling is the second downlink signaling in the disclosure.

In one subembodiment, the target downlink signaling is the first downlink signaling in the disclosure.

In one embodiment, the phrase that performing listening to judge whether a channel is idle refers that: detecting a received signal energy in frequency-domain resources corresponding to time-frequency resources in which wireless transmission is to be performed to judge whether a channel is idle.

In one embodiment, the phrase that giving up transmitting a radio signal in the any one of the K time-frequency resources other than the K1 time-frequency resource(s) includes: dropping a modulation symbol corresponding to a radio signal transmitted in the any one time-frequency resource.

In one embodiment, the phrase that giving up transmitting a radio signal in the any one of the K time-frequency resources other than the K1 time-frequency resource(s) includes: clearing a cache occupied by channel coded bits carried by a radio signal transmitted in the any one time-frequency resource.

In one embodiment, the phrase that giving up transmitting a radio signal in the any one of the K time-frequency resources other than the K1 time-frequency resource(s) includes: deferring transmission of a radio signal transmitted in the any one time-frequency resource.

In one embodiment, the UE U2 judges that a channel is idle, and the base station N1 receives a radio signal in the any one of the K time-frequency resources other than the K1 time-frequency resource(s); or, the UE judges that a channel is not idle, and the base station N1 receives no radio signal in the any one of the K time-frequency resources other than the K1 time-frequency resource(s).

Embodiment 9

Figure 9:
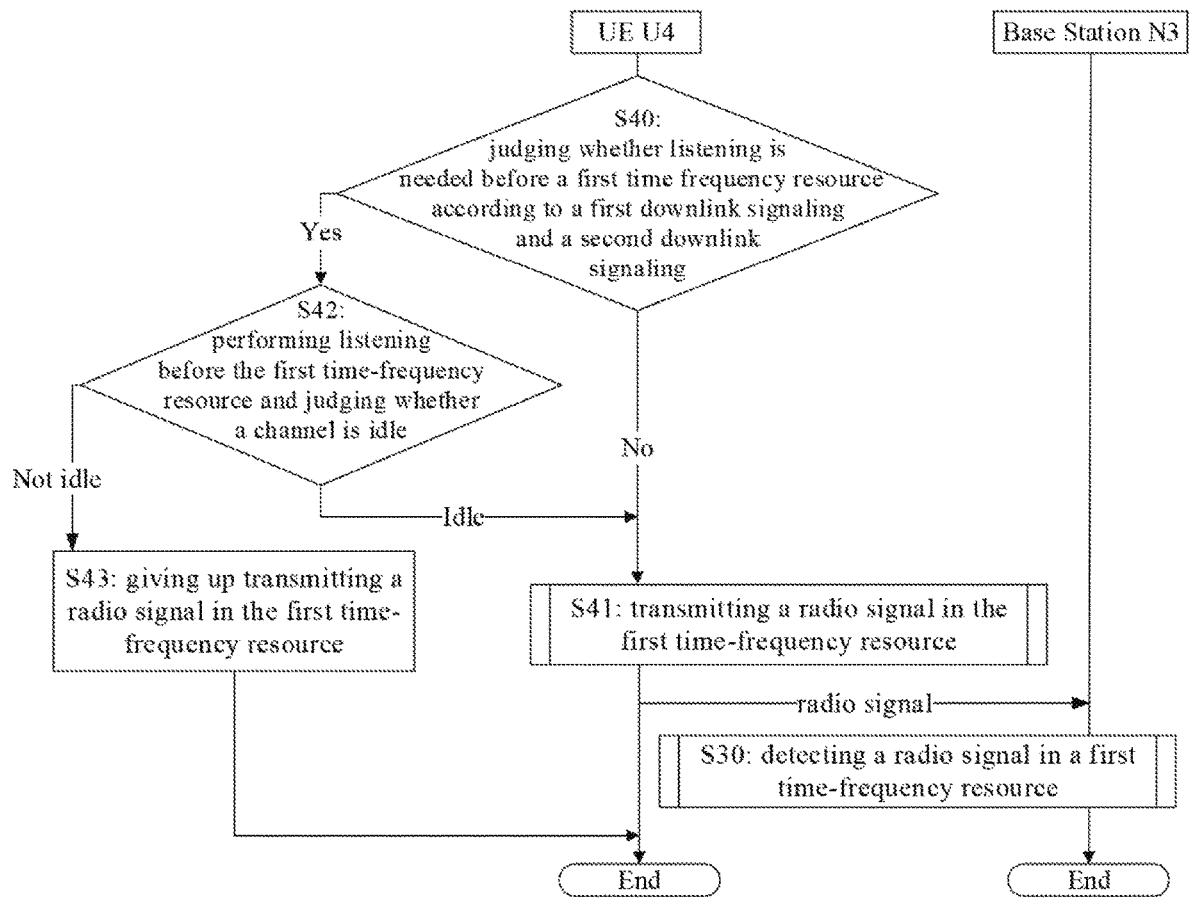
FIG. 9 is a flowchart of uplink transmission according to another embodiment of the disclosure.

Embodiment 9 illustrates an example of a flowchart of another uplink transmission, as shown in FIG. 9. In FIG. 9, a base station N3 is a maintenance base station for a serving cell of a UE U4. Embodiments and subembodiments in Embodiment 9 may be applied to Embodiment 8 if not conflict is incurred.

The base station N3 detects a radio signal in a first time-frequency resource in S30.

The UE U4 judges whether listening is needed before a first time-frequency resource according to a first downlink signaling and a second downlink signaling in S40; if judged to not listen, the UE U4 transmits a radio signal in the first time-frequency resource in S41; if judged to listen, the UE U4 performs listening before the first time-frequency resource and judges whether a channel is idle in S42; if the channel is idle, the UE U4 goes to S41; if the channel is not idle, the UE U4 gives up transmitting a radio signal in the first time-frequency resource in S43.

In Embodiment 9, the first time-frequency resource is one of the K time-frequency resources in the disclosure, the first downlink signaling is one of the K downlink signalings in the disclosure that indicates the first time-frequency resource; and the second downlink signaling is one of the K downlink signalings in the disclosure other than the first downlink signaling.

In one embodiment, the first time-frequency resource is the target time-frequency resource in the disclosure.

In one embodiment, the first downlink signaling is used for indicating no-listening, and the second downlink signaling is used for indicating listening.

In one embodiment, the first downlink signaling is used for indicating listening, and the second downlink signaling is used for indicating no-listening.

In one embodiment, the second downlink signaling is used for indicating a second time-frequency resource.

In one embodiment, the second downlink signaling is a downlink grant.

In one embodiment, the second downlink signaling is a DCI of downlink scheduling.

In one embodiment, the second downlink signaling is used for triggering transmission of a second radio signal, and the second radio signal includes a UCI.

In one embodiment, the first time-frequency resource and the second time-frequency resource are overlapping in time domain.

In one embodiment, the first time-frequency resource and the second time-frequency resource both belong to a first time window in time domain, and the first time window has a duration not greater than a first threshold.

In one embodiment, the second downlink signaling is used for indicating a second time-frequency resource, and a start time of the first time-frequency resource in time domain is behind a start time of the second time-frequency resource in time domain.

In one embodiment, the second downlink signaling is used for indicating a second time-frequency resource, and a start time of the first time-frequency resource in time domain is a start time of the second time-frequency resource in time domain.

In one embodiment, the second downlink signaling is used for indicating a second time-frequency resource, and a start time of the first time-frequency resource in time domain is before a start time of the second time-frequency resource in time domain.

In one embodiment, the second downlink signaling is used for indicating a second time-frequency resource, and an end time of the first time-frequency resource in time domain is behind an end time of the second time-frequency resource in time domain.

In one embodiment, the second downlink signaling is used for indicating a second time-frequency resource, a start time of the first time-frequency resource in time domain is before a start time of the second time-frequency resource in time domain, moreover, the time-domain resource occupied by the first time-frequency resource is overlapping with the time-domain resource occupied by the second time-frequency resource, and the UE U4 gives up wireless transmission in the second time-frequency resource.

In one embodiment, the second downlink signaling is used for indicating a second time-frequency resource, and an end time of the first time-frequency resource in time domain is behind a start time of the second time-frequency resource in time domain.

Embodiment 10

Figure 10:
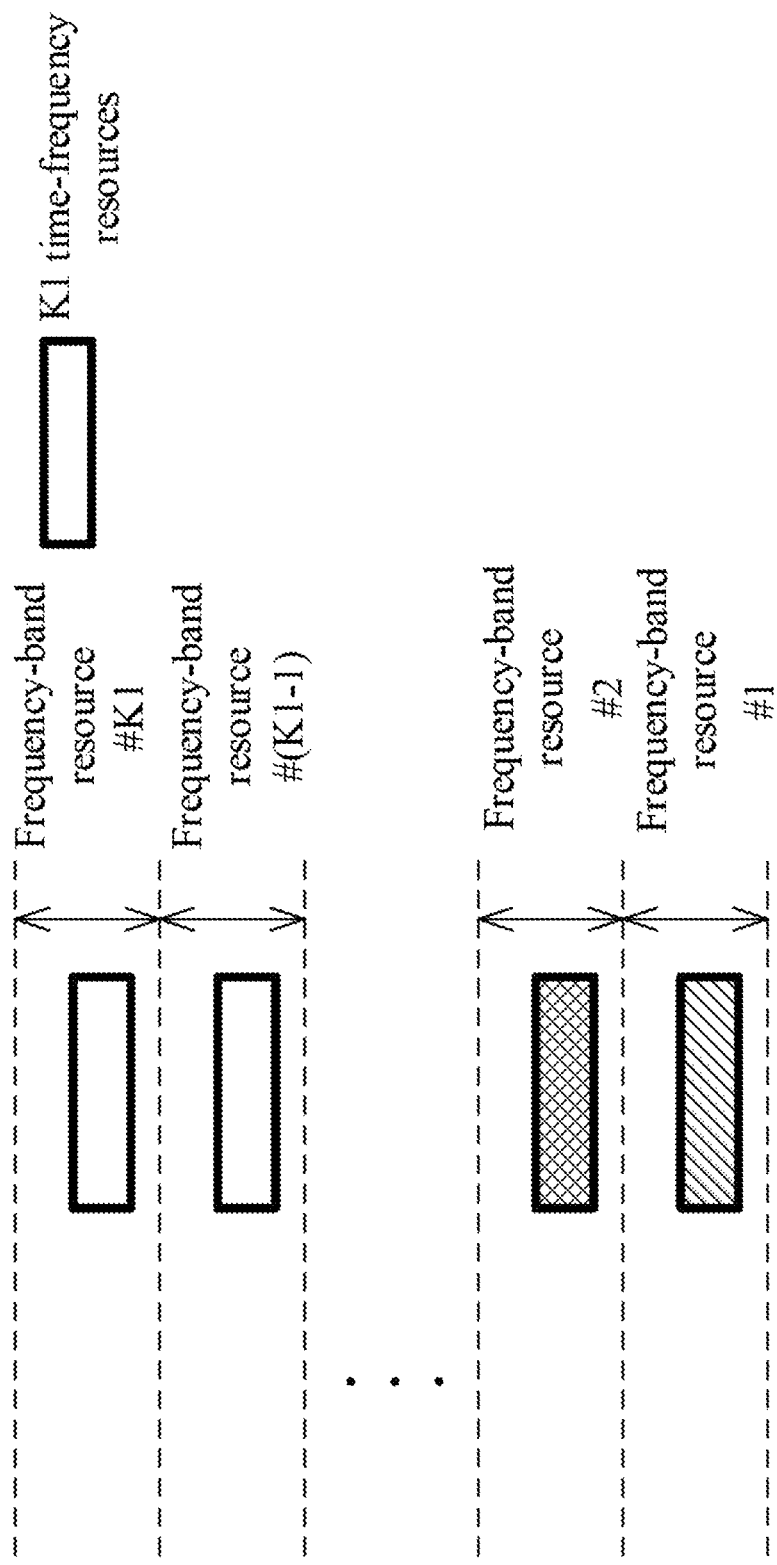
FIG. 10 is a diagram illustrating K1 time-frequency resources according to one embodiment of the disclosure.

Embodiment 10 illustrates an example of a diagram of K1 time-frequency resources, as shown in FIG. 10. In FIG. 10, the K1 time-frequency resources belong to K1 frequency-band resources respectively, corresponding to a frequency-band resource #1 to a frequency-band resource # K1 respectively; the target time-frequency resource in the disclosure belongs to a target frequency-band resource among the K1 frequency-band resources; in FIG. 10, a rectangle filled with slashes is the target time-frequency resource, and a rectangle filled with oblique grids is a candidate time-frequency resource.

In one embodiment, the target frequency-band resource is a frequency-band resource with a minimum center frequency among the K1 frequency-band resources.

In one embodiment, the target frequency-band resource is a frequency-band resource with a maximum center frequency among the K1 frequency-band resources.

In one embodiment, the first downlink signaling in the disclosure is used for indicating the target time-frequency resource, and the second downlink signaling in the disclosure is used for indicating the candidate time-frequency resource.

In one subembodiment, the first downlink signaling is used for indicating no-listening, and the second downlink signaling is used for indicating listening.

In one subembodiment, the first downlink signaling is an uplink grant, and the second downlink signaling is a downlink grant.

In one subembodiment, the candidate time-frequency resource is reserved to transmit an uplink HARQ-ACK corresponding to the downlink scheduling of the second downlink signaling, and the HARQ-ACK is transmitted in the target time-frequency resource.

Embodiment 11

Figure 11:
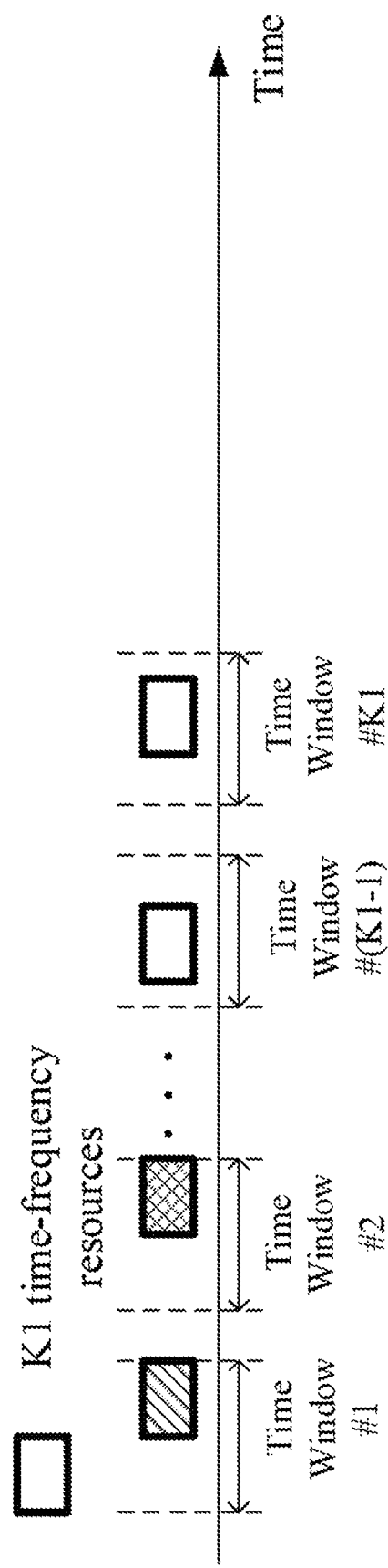
FIG. 11 is a diagram illustrating K1 time-frequency resources according to another embodiment of the disclosure.

Embodiment 11 illustrates an example of a diagram of K1 time-frequency resources, as shown in FIG. 11. In FIG. 11, the K1 time-frequency resources belong to K1 time windows respectively, corresponding to a time window #1 to a time window # K1 respectively; the target time-frequency resource in the disclosure belongs to a target time window among the K1 time windows; in FIG. 11, a rectangle filled with slashes is the target time-frequency resource, and a rectangle filled with oblique grids is a candidate time-frequency resource.

In one embodiment, the target time window is an earliest time window in time domain among the K1 time windows.

In one embodiment, the first downlink signaling in the disclosure is used for indicating the target time-frequency resource, and the second downlink signaling in the disclosure is used for indicating the candidate time-frequency resource.

In one subembodiment, the first downlink signaling is used for indicating no-listening, and the second downlink signaling is used for indicating listening.

In one subembodiment, the first downlink signaling is an uplink grant, and the second downlink signaling is a downlink grant.

In one subembodiment, the candidate time-frequency resource is reserved to transmit an uplink HARQ-ACK corresponding to the downlink scheduling of the second downlink signaling, and the HARQ-ACK is transmitted in the target time-frequency resource.

Embodiment 12

Figure 12:
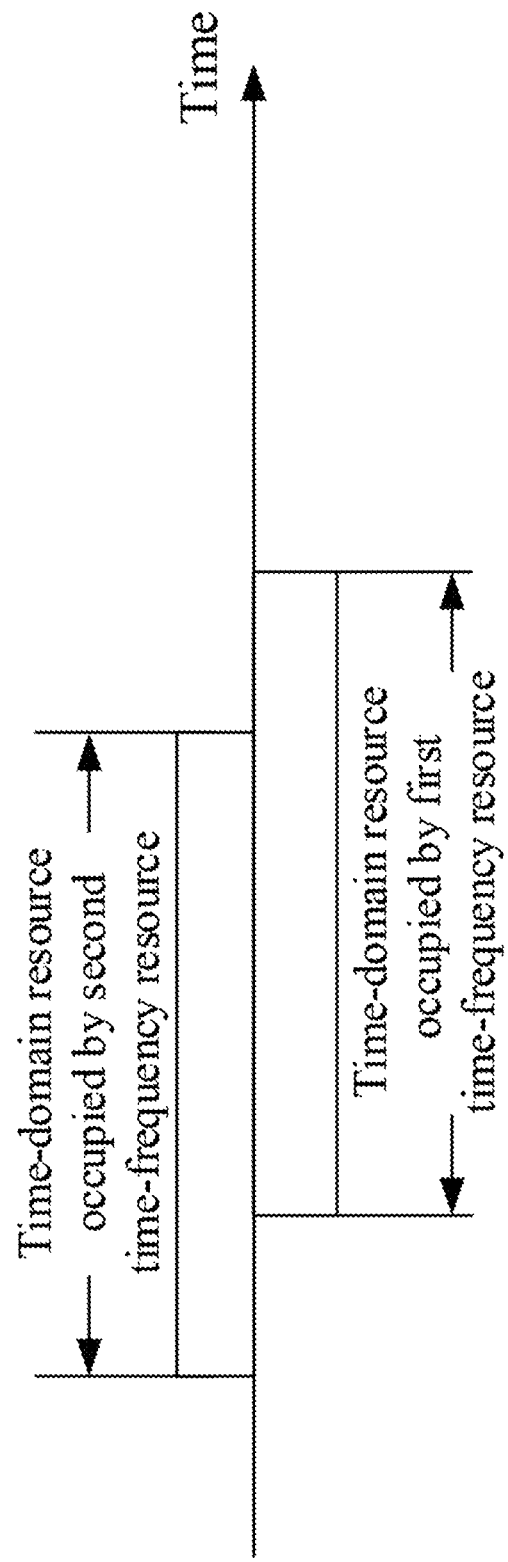
FIG. 12 is a diagram illustrating a first time-frequency resource and a second time-frequency resource according to one embodiment of the disclosure.

Embodiment 12 illustrates an example of a diagram of a first time-frequency resource and a second time-frequency resource, as shown in FIG. 12. In FIG. 12, the first time-frequency resource is indicated by the first downlink signaling in the disclosure, and the second time-frequency resource is associated to the second downlink signaling in the disclosure. A start point of a time-domain resource occupied by the second time-frequency resource is located before a start point of a time-domain resource occupied by the first time-frequency resource, and an end time of the second time-frequency resource in time domain is before an end time of the first time-frequency resource in time domain.

In one embodiment, the phrase that the second time-frequency resource is associated to the second downlink signaling in the disclosure refers that: the second downlink signaling is used for indicating the second time-frequency resource.

In one embodiment, the phrase that the second time-frequency resource is associated to the second downlink signaling in the disclosure refers that: the second downlink signaling is used for determining the second time-frequency resource.

In one embodiment, a UE judges to not listen according to the first downlink signaling and the second downlink signaling, thereby transmitting a first radio signal in the first time-frequency resource.

In one subembodiment, the first radio signal includes a first radio sub-signal and a second radio sub-signal; the first radio sub-signal and the second radio sub-signal are scheduled by the first downlink signaling and the second downlink signaling respectively.

In one embodiment, the first radio signal is scheduled by the first downlink signaling only, that is, the UE gives up performing scheduling of the second downlink signaling.

In one embodiment, if an uplink transmission scheduled by the first downlink signaling includes uplink control information and an uplink transmission scheduled by the second downlink signaling does not include uplink control information, it is judged to not listen; if an uplink transmission scheduled by the first downlink signaling does not include uplink control information and an uplink transmission scheduled by the second downlink signaling includes uplink control information, it is judged to listen.

In one embodiment, the second radio signal is scheduled by the second downlink signaling only, that is, the UE gives up performing scheduling of the first downlink signaling.

Embodiment 13

Figure 13:
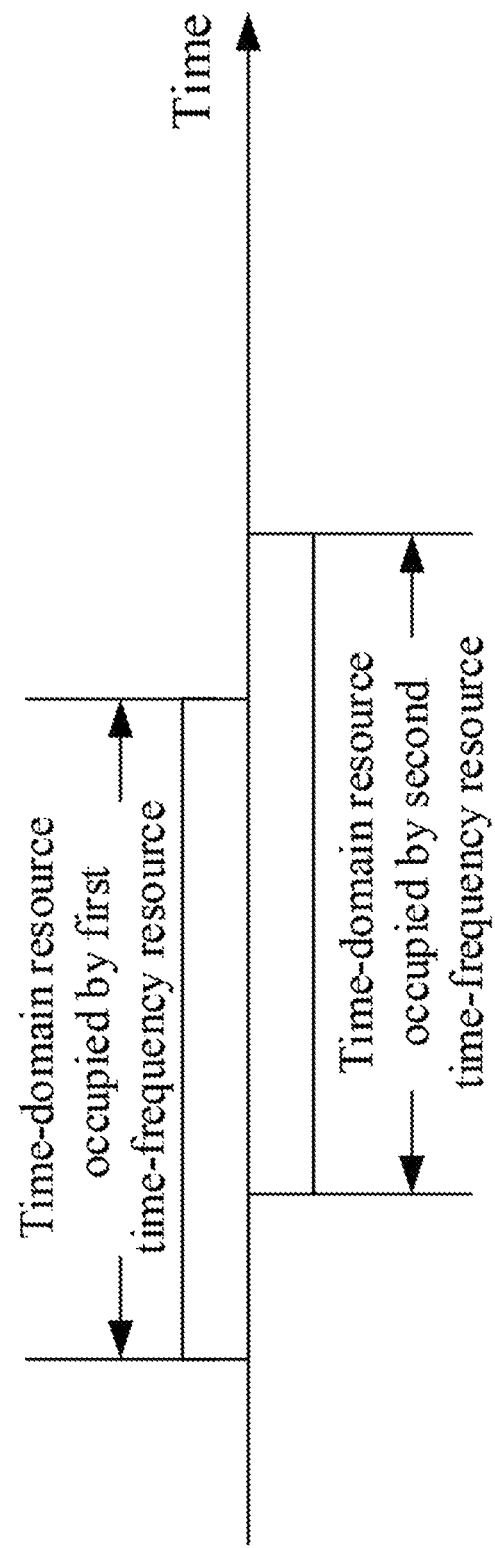
FIG. 13 is a diagram illustrating a first time-frequency resource and a second time-frequency resource according to another embodiment of the disclosure.

Embodiment 13 illustrates an example of another diagram of a first time-frequency resource and a second time-frequency resource, as shown in FIG. 13. In FIG. 13, the first time-frequency resource is indicated by the first downlink signaling in the disclosure, and the second time-frequency resource is associated to the second downlink signaling in the disclosure. A start point of a time-domain resource occupied by the second time-frequency resource is located behind a start point of a time-domain resource occupied by the first time-frequency resource, and an end time of the second time-frequency resource in time domain is behind an end time of the first time-frequency resource in time domain.

In one embodiment, the phrase that the second time-frequency resource is associated to the second downlink signaling in the disclosure refers that: the second downlink signaling is used for indicating the second time-frequency resource.

In one embodiment, the phrase that the second time-frequency resource is associated to the second downlink signaling in the disclosure refers that: the second downlink signaling is used for determining the second time-frequency resource.

In one embodiment, if time-domain resources occupied by the second downlink signaling are behind time-domain resources occupied by the first downlink signaling, it is judged to listen; if time-domain resources occupied by the second downlink signaling are before time-domain resources occupied by the first downlink signaling, it is judged to not listen.

In one embodiment, the second downlink signaling is used for indicating listening, and the first downlink signaling is used for indicating no-listening.

In one embodiment, if an uplink transmission scheduled by the second downlink signaling includes uplink control information and an uplink transmission scheduled by the first downlink signaling does not include uplink control information, it is judged to not listen; if an uplink transmission scheduled by the first downlink signaling does not include uplink control information and an uplink transmission scheduled by the second downlink signaling includes uplink control information, it is judged to listen.

In one embodiment, the uplink control information includes a HARQ-ACK.

In one embodiment, the uplink control information includes a CSI.

In one embodiment, the uplink control information includes an SR.

In one embodiment, the uplink control information includes a Beam Recovery Request (BPR).

In one embodiment, the first radio signal includes a first radio sub-signal and a second radio sub-signal; the first radio sub-signal and the second radio sub-signal are scheduled by the first downlink signaling and the second downlink signaling respectively.

In one embodiment, the first radio signal is scheduled by the first downlink signaling only, that is, the UE gives up performing scheduling of the second downlink signaling.

In one embodiment, the second radio signal is scheduled by the second downlink signaling only, that is, the UE gives up performing scheduling of the first downlink signaling.

Embodiment 14

Figure 14:
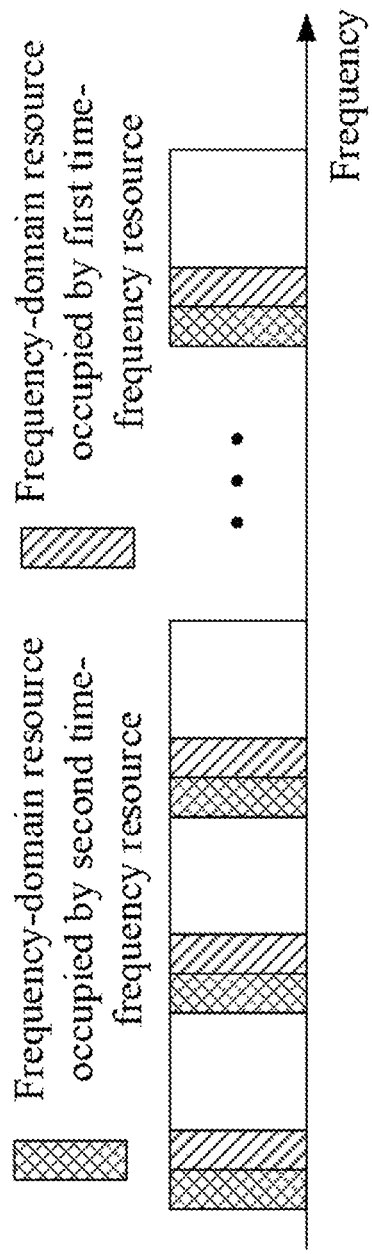
FIG. 14 is a diagram illustrating a first time-frequency resource and a second time-frequency resource according to yet another embodiment of the disclosure.

Embodiment 14 illustrates an example of yet another diagram of a first time-frequency resource and a second time-frequency resource, as shown in FIG. 14. In FIG. 14, the first time-frequency resource is indicated by the first downlink signaling in the disclosure, and the second time-frequency resource is associated to the second downlink signaling in the disclosure. A rectangle filled with crosslines represents a frequency-domain resource occupied by the second time-frequency resource, and a rectangle filled with backslashes represents a frequency-domain resource occupied by the first time-frequency resource.

In one embodiment, the frequency-domain resource occupied by the second time-frequency resource is orthogonal to the frequency-domain resource occupied by the first time-frequency resource.

In one embodiment, the phrase that the second time-frequency resource is associated to the second downlink signaling in the disclosure refers that: the second downlink signaling is used for indicating the second time-frequency resource.

In one embodiment, the phrase that the second time-frequency resource is associated to the second downlink signaling in the disclosure refers that: the second downlink signaling is used for determining the second time-frequency resource.

In one embodiment, the frequency-domain resource occupied by the second time-frequency resource and the frequency-domain resource occupied by the first time-frequency resource are discrete in time domain respectively so as to meet requirements of bandwidth occupied by unlicensed spectrum communications in regulations.

In one embodiment, the second time-frequency resource and the first time-frequency resource occupy multiple sub-carrier groups respectively, each of the multiple subcarrier groups includes a positive integer number of consecutive subcarriers, and the multiple subcarrier groups occur in frequency domain at equal intervals successively.

Embodiment 15

Figure 15:
FIG. 15 is a diagram illustrating target information according to one embodiment of the disclosure.

Embodiment 15 illustrates an example of a diagram of a target time-frequency resource, as shown in FIG. 15. In FIG. 15, a big rectangle represents REs occupied by the target time-frequency resource, the target time-frequency resource includes M1 REs, the M1 REs include a first RE set, the first RE set is used for transmitting the target information in the disclosure, and REs in the target time-frequency resource other than the first RE set are used for transmitting a target radio signal; the M1 is a positive integer greater than 1; the part filled with oblique grids in FIG. 15 represents the first RE set.

In one embodiment, the target time-frequency resource is indicated by the first downlink signaling, and the target radio signal is scheduled by the first downlink signaling.

In one embodiment, the target time-frequency resource is indicated by the target downlink signaling in the disclosure, and the target radio signal is scheduled by the target downlink signaling in the disclosure.

In one embodiment, the target information at least includes an uplink HARQ-ACK corresponding to downlink data scheduled by one of the K downlink signalings other than the first downlink signaling in the disclosure.

Embodiment 16

Figure 16:
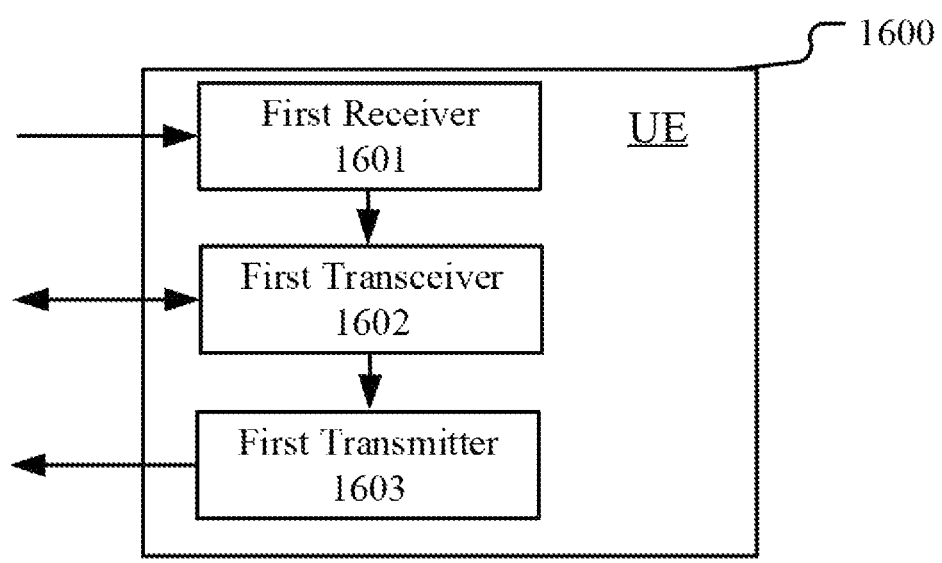
FIG. 16 is a structure block diagram illustrating a processing device used in a UE according to one embodiment of the disclosure.

Embodiment 16 illustrates an example of a structure block diagram of a processing device in a UE, as shown in FIG. 16. In FIG. 16, the processing device 1600 in the UE mainly includes a first receiver 1601, a first transceiver 1602 and a first transmitter 1603.

The first receiver 1601 receives K downlink signalings, the K downlink signalings indicating K time-frequency resources respectively.

The first transceiver 1602 determines K1 time-frequency resource(s) from the K time-frequency resources, only the K1 time-frequency resource(s) among the K time-frequency resources needing no listening before wireless transmission therein.

The first transmitter 1603 transmits target information in a target time-frequency resource.

In one embodiment, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one embodiment, the K downlink signalings include K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

In one embodiment, the first transceiver 1602 judges whether listening is needed before a first time-frequency resource according to a first downlink signaling and a second downlink signaling; the first time-frequency resource is one of the K time-frequency resources, the first downlink signaling is one of the K downlink signalings that indicates the first time-frequency resource; and the second downlink signaling is one of the K downlink signalings other than the first downlink signaling.

In one embodiment, the first transceiver 1602 further transmits K1 radio signal(s) in the K1 time-frequency resource(s) respectively, one of the K1 radio signal(s) transmitted in the target time-frequency resource including the target information; for any one of the K time-frequency resources other than the K1 time-frequency resource(s), the first transceiver 1602 performs listening to judge whether a channel is idle; if idle, the first transceiver 1602 transmits a radio signal in the any one of the K time-frequency resources other than the K1 time-frequency resource(s); otherwise, the first transceiver 1602 gives up transmitting a radio signal in the any one of the K time-frequency resources other than the K1 time-frequency resource(s); the K1 radio signal(s) is(are) directly transmitted by the first transceiver 1602 without listening.

In one embodiment, the first receiver 1601 includes at least the former four of the antenna 452, the receiver 454, the multi-antenna receiving processor 458, the receiving processor 456 and the controller/processor 459 illustrated in Embodiment 4.

In one embodiment, the first transceiver 1602 includes at least the former six of the antenna 452, the transmitter/receiver 454, the multi-antenna receiving processor 458, the multi-antenna transmitting processor 457, the receiving processor 456, the transmitting processor 458 and the controller/processor 459 illustrated in Embodiment 4.

In one embodiment, the first transmitter 1603 includes at least the former four of the antenna 452, the transmitter 454, the multi-antenna transmitting processor 457, the transmitting processor 468 and the controller/processor 459 illustrated in Embodiment 4.

Embodiment 17

Figure 17:
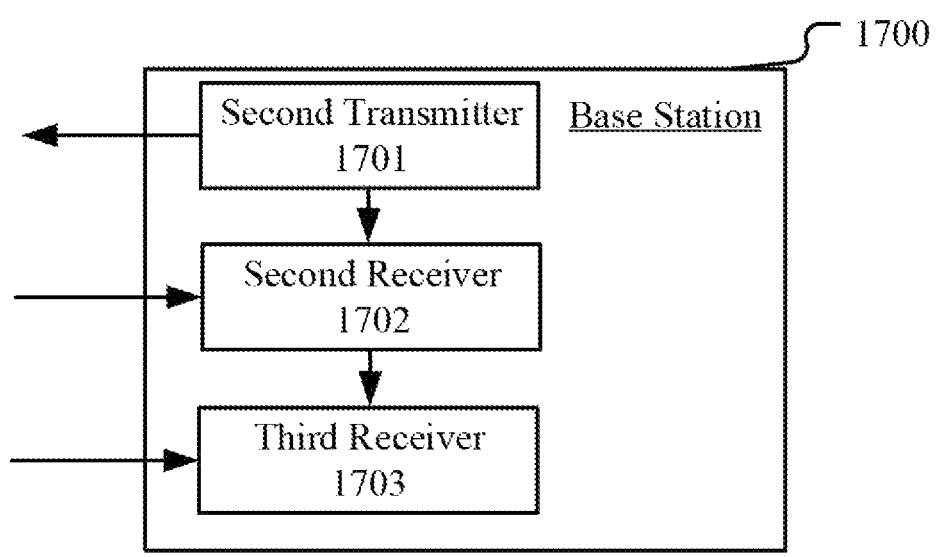
FIG. 17 is a structure block diagram illustrating a processing device used in a base station according to one embodiment of the disclosure.

Embodiment 17 illustrates an example of a structure block diagram of a processing device in a base station, as shown in FIG. 17. In FIG. 17, the processing device 1700 in the base station includes a second transmitter 1701, a second receiver 1702 and a third receiver 1703.

The second transmitter 1701 transmits K downlink signalings, the K downlink signalings indicating K time-frequency resources respectively.

The second receiver 1702 determines K1 time-frequency resource(s) from the K time-frequency resources, only the K1 time-frequency resource(s) among the K time-frequency resources needing no listening before wireless transmission therein.

The third receiver 1703 receives target information in a target time-frequency resource.

In Embodiment 17, the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

In one embodiment, the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

In one embodiment, the K downlink signalings include K1 downlink signaling(s), the K1 downlink signaling(s) indicate(s) the K1 frequency-band resource(s) respectively; the K1 downlink signaling(s) indicate(s) no-listening respectively; and any one of the K downlink signalings other than the K1 downlink signaling(s) indicates listening.

In one embodiment, the second receiver 1702 detects a radio signal in a first time-frequency resource; the first time-frequency resource is one of the K time-frequency resources, a first downlink signaling is one of the K downlink signalings that indicates the first time-frequency resource; a second downlink signaling is one of the K downlink signalings other than the first downlink signaling; the first downlink signaling and the second downlink signaling are used for judging whether listening is needed before the first time-frequency resource; if judged to not listen, a first terminal transmits a radio signal in the first time-frequency resource; if judged to listen, the first terminal performs listening before the first time-frequency resource to judge whether a channel is idle and determines whether to transmit a radio signal in the first time-frequency resource; and a transmitter of the target information is the first terminal.

In one embodiment, the second receiver 1702 receives K1 radio signal(s) in the K1 time-frequency resource(s) respectively, one of the K1 radio signal(s) transmitted in the target time-frequency resource including the target information; the second receiver 1702 detects a radio signal in any one of the K time-frequency resources other than the K1 time-frequency resource(s); the K1 radio signal(s) is(are) directly transmitted without listening; the second receiver 1702 judges that a channel is idle, and the second receiver 1702 receives a radio signal in the any one of the K time-frequency resources other than the K1 time-frequency resource(s); or, the second receiver 1702 judges that a channel is not idle, and the second receiver 1702 receives no radio signal in the any one of the K time-frequency resources other than the K1 time-frequency resource(s).

In one embodiment, the second transmitter 1701 includes at least the former four of the antenna 420, the transmitter 418, the multi-antenna transmitting processor 471, the transmitting processor 416 and the controller/processor 475 illustrated in Embodiment 4.

In one embodiment, the second receiver 1702 includes at least the former four of the antenna 420, the receiver 418, the multi-antenna receiving processor 472, the receiving processor 470 and the controller/processor 475 illustrated in Embodiment 4.

In one embodiment, the third receiver 1703 includes at least the former four of the antenna 420, the receiver 418, the multi-antenna receiving processor 472, the receiving processor 470 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
    receiving K downlink signalings, the K downlink signalings indicating K time-frequency resources respectively;
    determining K1 time-frequency resource(s) from the K time-frequency resources, only the K1 time-frequency resource(s) among the K time-frequency resources needing no listening before wireless transmission therein; and
    transmitting target information in a target time-frequency resource;
    judging whether listening is needed before a first time-frequency resource according to a first downlink signaling and a second downlink signaling;
    wherein the first time-frequency resource is one of the K time-frequency resources, the first downlink signaling is one of the K downlink signalings that indicates the first time-frequency resource; and the second downlink signaling is one of the K downlink signalings other than the first downlink signaling; the second downlink signaling is used for indicating a second time-frequency resource; the time-domain resource occupied by the first time-frequency resource is overlapping with the time-domain resource occupied by the second time-frequency resource; the first downlink signaling is used for indicating no-listening, and the second downlink signaling is used for indicating listening; the meaning of judging whether listening is needed before a first time-frequency resource according to the first downlink signaling and the second downlink signaling includes one of the following parts:
    when an uplink transmission scheduled by the first downlink signaling includes uplink control information and an uplink transmission scheduled by the second downlink signaling does not include uplink control information, it is judged to not listen;
    when an uplink transmission scheduled by the first downlink signaling does not include uplink control information and an uplink transmission scheduled by the second downlink signaling includes uplink control information, it is judged to listen;
    when time-domain resources occupied by the second downlink signaling are behind time-domain resources occupied by the first downlink signaling, it is judged to listen; and
    when time-domain resources occupied by the second downlink signaling are before time-domain resources occupied by the first downlink signaling, it is judged to not listen; and
    wherein the target time-frequency resource is one of the K1 time-frequency resource(s) determined according to a predefined criterion, the K1 is a positive integer less than the K, the K is a positive integer greater than one, and the K time-frequency resources are all deployed on unlicensed spectrum.

2. The method according to claim 1, wherein the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

3. The method according to claim 1, wherein the K downlink signalings comprise K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

4. The method according to claim 1, comprising:
    transmitting K1 radio signal(s) in the K1 time-frequency resource(s) respectively, one of the K1 radio signal(s)

transmitted in the target time-frequency resource comprising the target information;

for any one of the K time-frequency resources other than the K1 time-frequency resource(s), performing listening to judge whether a channel is idle; if idle, transmitting a radio signal in the any one of the K time-frequency resources other than the K1 time-frequency resource(s); otherwise, giving up transmitting a radio signal in the any one of the K time-frequency resources other than the K1 time-frequency resource(s);

wherein the K1 radio signal(s) is(are) directly transmitted without listening.

5. A method in a base station for wireless communication, comprising:

transmitting K downlink signalings, the K downlink signalings indicating K time-frequency resources respectively;

determining K1 time-frequency resource(s) from the K time-frequency resources, only the K1 time-frequency resource(s) among the K time-frequency resources needing no listening before wireless transmission therein; and receiving target information in a target time-frequency resource;

detecting a radio signal in a first time-frequency resource;

wherein the first time-frequency resource is one of the K time-frequency resources, a first downlink signaling is one of the K downlink signalings that indicates the first time-frequency resource; and a second downlink signaling is one of the K downlink signalings other than the first downlink signaling; the first downlink signaling and the second downlink signaling are used for judging whether listening is needed before the first time-frequency resource; if judged to not listen, a first terminal transmits a radio signal in the first time-frequency resource; if judged to listen, the first terminal performs listening before the first time-frequency resource to judge whether a channel is idle and determines whether to transmit a radio signal in the first time-frequency resource; and a transmitter of the target information is the first terminal; the second downlink signaling is used for indicating a second time-frequency resource; the time-domain resource occupied by the first time-frequency resource is overlapping with the time-domain resource occupied by the second time-frequency resource; the first downlink signaling is used for indicating no-listening, and the second downlink signaling is used for indicating listening; the meaning of judging whether listening is needed before a first time-frequency resource according to the first downlink signaling and the second downlink signaling includes one of the following parts:

when an uplink transmission scheduled by the first downlink signaling includes uplink control information and an uplink transmission scheduled by the second downlink signaling does not include uplink control information, it is judged to not listen;

when an uplink transmission scheduled by the first downlink signaling does not include uplink control information and an uplink transmission scheduled by the second downlink signaling includes uplink control information, it is judged to listen;

when time-domain resources occupied by the second downlink signaling are behind time-domain resources occupied by the first downlink signaling, it is judged to listen; and when time-domain resources occupied by the second downlink signaling are before time-domain resources occupied by the first downlink signaling, it is judged to not listen; and wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum.

6. The method according to claim 5, wherein the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

7. The method according to claim 5, wherein the K downlink signalings comprise K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

8. The method according to claim 5, comprising:

receiving K1 radio signal(s) in the K1 time-frequency resource(s) respectively, one of the K1 radio signal(s) transmitted in the target time-frequency resource comprising the target information; and detecting a radio signal in any one of the K time-frequency resources other than the K1 time-frequency resource(s);

wherein the K1 radio signal(s) is(are) directly transmitted without listening; a channel is judged to be idle, and a radio signal is received in the any one of the K time-frequency resources other than the K1 time-frequency resource(s); or, a channel is judged to be not idle, and no radio signal is received in the any one of the K time-frequency resources other than the K1 time-frequency resource(s).

9. A User Equipment (UE) for wireless communication, comprising:

a first receiver, to receive K downlink signalings, the K downlink signalings indicating K time-frequency resources respectively;

a first transceiver, to determine K1 time-frequency resource(s) from the K time-frequency resources, only the K1 time-frequency resource(s) among the K time-frequency resources needing no listening before wireless transmission therein; and a first transmitter, to transmit target information in a target time-frequency resource;

wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum;

wherein the first transceiver judges whether listening is needed before a first time-frequency resource according to a first downlink signaling and a second downlink signaling; the first time-frequency resource is one of the K time-frequency resources, the first downlink signaling is one of the K downlink signalings that indicates the first time-frequency resource; and the second downlink signaling is one of the K downlink signalings other than the first downlink signaling; the second downlink signaling is used for indicating a second time-frequency resource; the time-domain resource occupied by the first time-frequency resource is overlapping with the time-domain resource occupied by the second time-frequency resource; the first downlink signaling is used for indicating no-listening, and the second downlink signaling is used for indicating listening; the meaning of judging whether listening is needed before a first time-frequency resource according to the first downlink signaling and the second downlink signaling includes one of the following parts:
when an uplink transmission scheduled by the first downlink signaling includes uplink control information and an uplink transmission scheduled by the second downlink signaling does not include uplink control information, it is judged to not listen;
when an uplink transmission scheduled by the first downlink signaling does not include uplink control information and an uplink transmission scheduled by the second downlink signaling includes uplink control information, it is judged to listen;
when time-domain resources occupied by the second downlink signaling are behind time-domain resources occupied by the first downlink signaling, it is judged to listen; and
when time-domain resources occupied by the second downlink signaling are before time-domain resources occupied by the first downlink signaling, it is judged to not listen.

10. The UE according to claim 9, wherein the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

11. The UE according to claim 9, wherein the K downlink signalings comprise K1 downlink signaling(s), the K1 downlink signaling(s) indicate(s) the K1 time-frequency resource(s) respectively; the K1 downlink signaling(s) indicate(s) no-listening respectively; and any one of the K downlink signalings other than the K1 downlink signaling(s) indicates listening.

12. The UE according to claim 9, wherein the first transceiver transmits K1 radio signal(s) in the K1 time-frequency resource(s) respectively, one of the K1 radio signal(s) transmitted in the target time-frequency resource comprising the target information; for any one of the K time-frequency resources other than the K1 time-frequency resource(s), the first transceiver performs listening to judge whether a channel is idle; if idle, the first transceiver transmits a radio signal in the any one of the K time-frequency resources other than the K1 time-frequency resource(s); otherwise, the first transceiver gives up transmitting a radio signal in the any one of the K time-frequency resources other than the K1 time-frequency resource(s); and the K1 radio signal(s) is(are) directly transmitted without listening.

13. A base station for wireless communication, comprising:
a second transmitter, to transmit K downlink signalings, the K downlink signalings indicating K time-frequency resources respectively;
a second receiver, to determine K1 time-frequency resource(s) from the K time-frequency resources, only the K1 time-frequency resource(s) among the K time-frequency resources needing no listening before wireless transmission therein; and
a third receiver, to receive target information in a target time-frequency resource;
wherein the target time-frequency resource is one of the K1 time-frequency resource(s) determined according to a predefined criterion, the K1 is a positive integer less than the K, the K is a positive integer greater than 1, and the K time-frequency resources are all deployed on unlicensed spectrum;
wherein the second receiver detects a radio signal in a first time-frequency resource; the first time-frequency resource is one of the K time-frequency resources, a first downlink signaling is one of the K downlink signalings that indicates the first time-frequency resource; and a second downlink signaling is one of the K downlink signalings other than the first downlink signaling;
the first downlink signaling and the second downlink signaling are used for judging whether listening is needed before the first time-frequency resource; if judged to not listen, a first terminal transmits a radio signal in the first time-frequency resource; if judged to listen, the first terminal performs listening before the first time-frequency resource to judge whether a channel is idle and determines whether to transmit a radio signal in the first time-frequency resource; and a transmitter of the target information is the first terminal; the second downlink signaling is used for indicating a second time-frequency resource; the time-domain resource occupied by the first time-frequency resource is overlapping with the time-domain resource occupied by the second time-frequency resource; the first downlink signaling is used for indicating no-listening, and the second downlink signaling is used for indicating listening; the meaning of judging whether listening is needed before a first time-frequency resource according to the first downlink signaling and the second downlink signaling includes one of the following parts:
when an uplink transmission scheduled by the first downlink signaling includes uplink control information and an uplink transmission scheduled by the second downlink signaling does not include uplink control information, it is judged to not listen;
when an uplink transmission scheduled by the first downlink signaling does not include uplink control information and an uplink transmission scheduled by the second downlink signaling includes uplink control information, it is judged to listen;
when time-domain resources occupied by the second downlink signaling are behind time-domain resources occupied by the first downlink signaling, it is judged to listen; and
when time-domain resources occupied by the second downlink signaling are before time-domain resources occupied by the first downlink signaling, it is judged to not listen.

14. The base station according to claim 13, wherein the phrase that the target time-frequency resource is one of the K1 time-frequency resource(s) determined according to a predefined criterion refers that: an index of a frequency-band resource to which the target time-frequency resource belongs is a first index, the K1 time-frequency resource(s) belong(s) to K1 frequency-band resource(s) respectively, index(es) of the K1 frequency-band resource(s) is(are) K1 index(es) respectively, and the first index is a minimum index among the K1 index(es).

15. The base station according to claim 13, wherein the K downlink signalings comprise K1 downlink signaling(s), the K1 downlink signaling(s) indicate(s) the K1 frequency-band resource(s) respectively; the K1 downlink signaling(s) indicate(s) no-listening respectively; and any one of the K downlink signalings other than the K1 downlink signaling(s) indicates listening.

16. The base station according to claim 13, wherein the second receiver receives K1 radio signal(s) in the K1 time-frequency resource(s) respectively, one of the K1 radio signal(s) transmitted in the target time-frequency resource comprising the target information; and the second receiver detects a radio signal in any one of the K time-frequency resources other than the K1 time-frequency resource(s); the K1 radio signal(s) is(are) directly transmitted without listening; the second receiver judges that a channel is idle, and the second receiver receives a radio signal in the any one of the K time-frequency resources other than the K1 time-frequency resource(s); or, the second receiver judges that a channel is not idle, and the second receiver receives no radio signal in the any one of the K time-frequency resources other than the K1 time-frequency resource(s).

* * * * *